US006845362B2

(12) United States Patent
Furuta et al.

(10) Patent No.: US 6,845,362 B2
(45) Date of Patent: Jan. 18, 2005

(54) CHARGING SYSTEM WHICH CARRIES OUT DATA PROCESSING FOR FEE PAYMENT

(75) Inventors: Yasuyuki Furuta, Nishikamo-gun (JP); Masaki Kakihara, Yokohama (JP); Yasuyuki Aoki, Nagoya (JP); Haruhiko Terada, Obu (JP)

(73) Assignees: Toyota Jidosha Kabushiki Kaisha, Toyota (JP); Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/984,071

(22) Filed: Oct. 26, 2001

(65) Prior Publication Data

US 2002/0049630 A1 Apr. 25, 2002

Related U.S. Application Data

(63) Continuation of application No. PCT/JP00/02437, filed on Apr. 14, 2000.

(30) Foreign Application Priority Data

Apr. 28, 1999 (JP) .......................................... 11-121825

(51) Int. Cl.[7] .............................................. G06F 17/60
(52) U.S. Cl. ........................................ 705/13; 701/214
(58) Field of Search .................. 705/13, 417; 340/928, 340/932.2, 993; 701/213–217; 342/357.08, 357.12, 357.13; 702/94, 95

(56) References Cited

U.S. PATENT DOCUMENTS

| | | | | |
|---|---|---|---|---|
| 5,694,322 A | * | 12/1997 | Westerlage et al. ......... | 705/417 |
| 5,721,678 A | * | 2/1998 | Widl .......................... | 705/417 |
| 5,781,101 A | | 7/1998 | Stephen et al. | |
| 6,012,013 A | * | 1/2000 | McBurney .................. | 701/207 |
| 6,028,550 A | * | 2/2000 | Froeberg et al. ........ | 342/357.13 |

FOREIGN PATENT DOCUMENTS

| | | | | |
|---|---|---|---|---|
| DE | 19832035 | | 2/1999 | |
| GB | 2326009 A | * | 12/1998 | ........... G07B/15/00 |
| JP | 63-4399 | | 1/1988 | |
| JP | 5-69624 | | 9/1993 | |
| JP | 8-14927 | | 1/1996 | |
| JP | 8-96181 | | 4/1996 | |
| JP | 09326058 | | 5/1996 | |
| JP | 10170289 | | 5/1996 | |
| JP | 8-195980 | | 7/1996 | |
| JP | 9-212794 | | 8/1997 | |
| JP | 9-319904 | | 12/1997 | |
| JP | 10-170289 | | 6/1998 | |

OTHER PUBLICATIONS

Tulloch, Martha H. "Fiber Optic Gyros Help Tokyo Drivers Navigate." Photonics Spectra, vol. 27, No. 1, p. 18(2), Jan. 1993.*

* cited by examiner

*Primary Examiner*—Susanna Meinecke-Diaz
(74) *Attorney, Agent, or Firm*—Pillsbury Winthrop LLP

(57) ABSTRACT

A charging system which carries out position confirmation of a moving body at a place where there is a radio wave blocked facility, and which carries out automatic detection of GPS antenna blockage for avoiding charging. The charging system includes a GPS positioning device for recognizing a vehicle position, a vehicle speed pulse measuring device for dead reckoning navigating, a monitor device which generates information expressing a current position by using these, and a charging processing which judges whether or not a recognized current position is within a charge area and which carries out data processing for charging. The monitor includes a simple map database which includes positions of facilities or geographical features at which GPS positioning is impossible, and when GPS positioning is impossible, the facility or geographical feature corresponding to the current position is detected, and that position is made to be a current position.

7 Claims, 18 Drawing Sheets

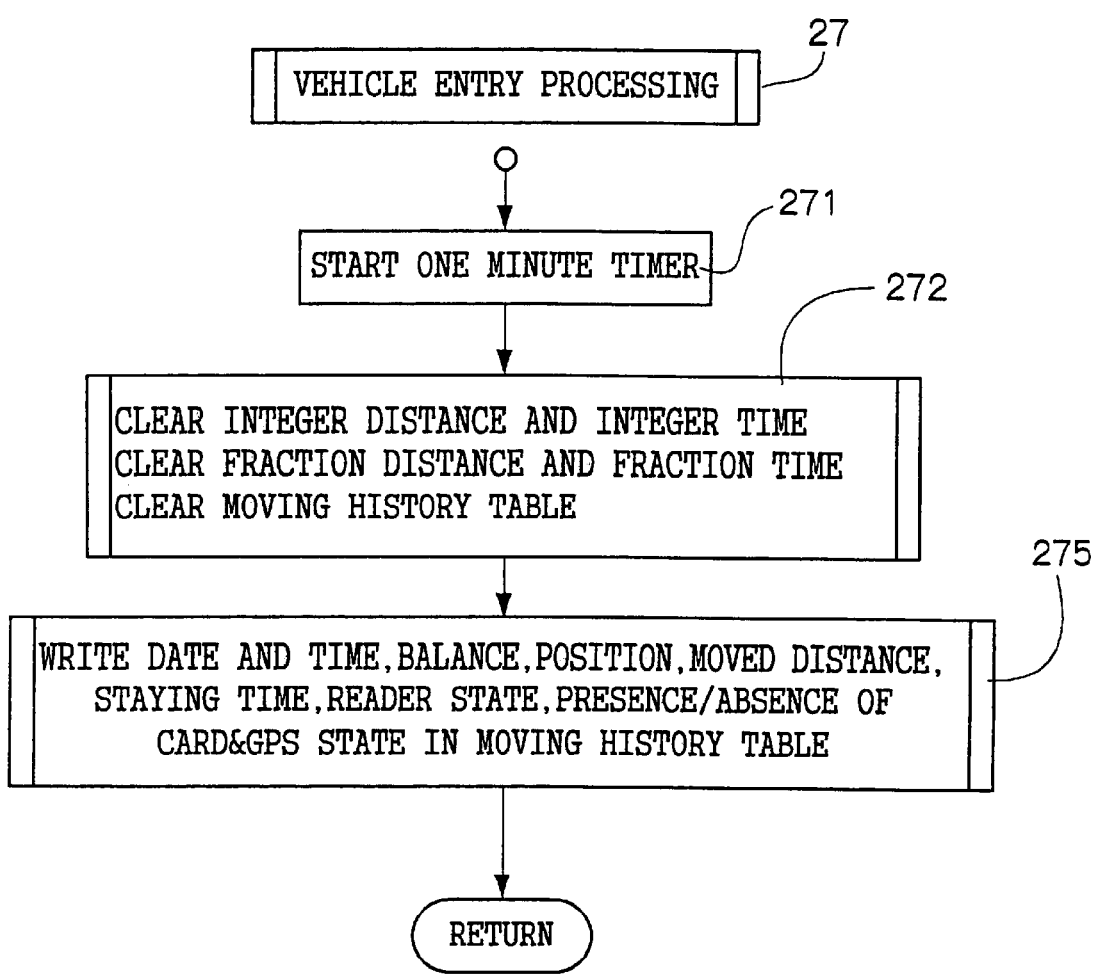

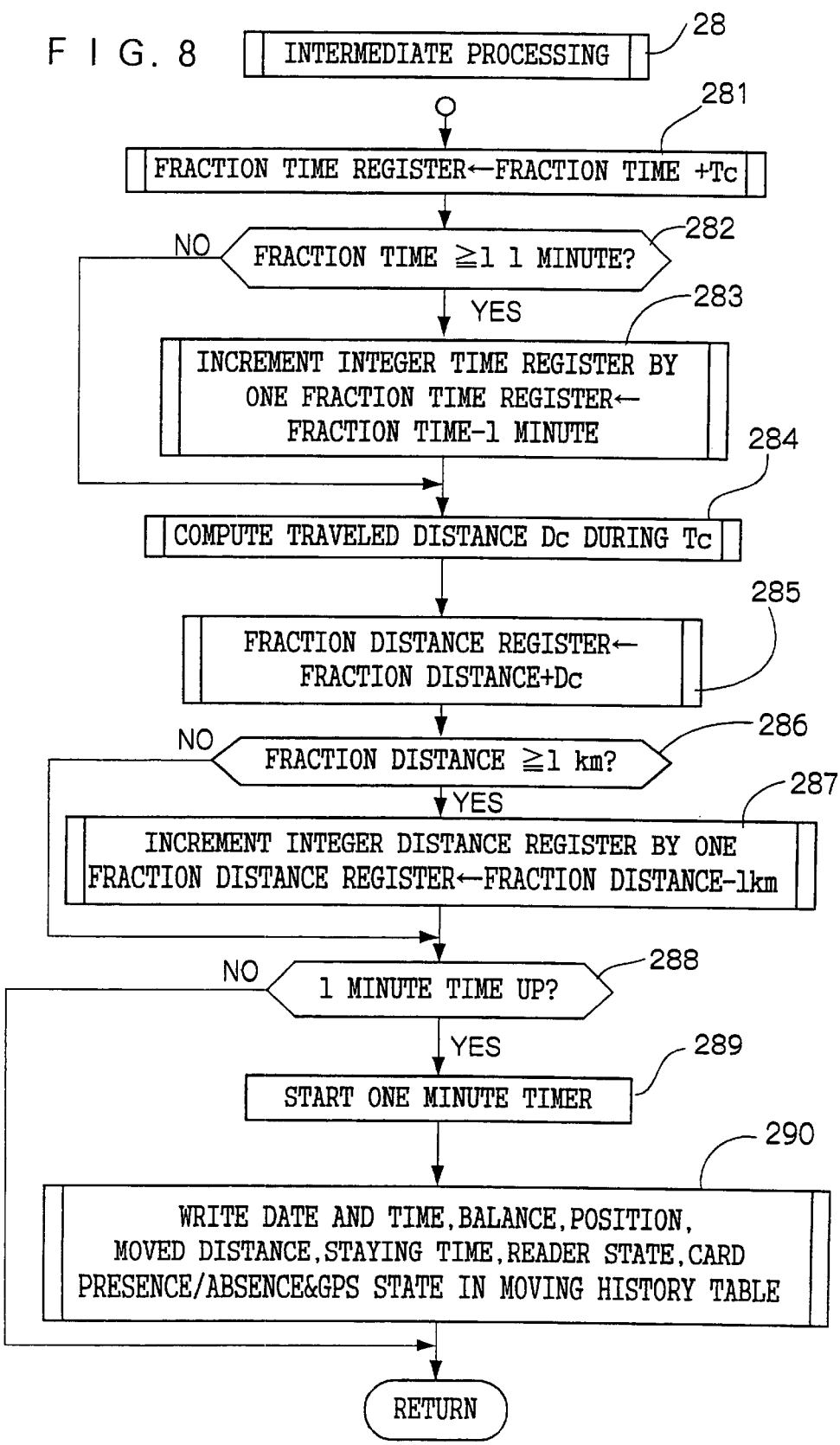

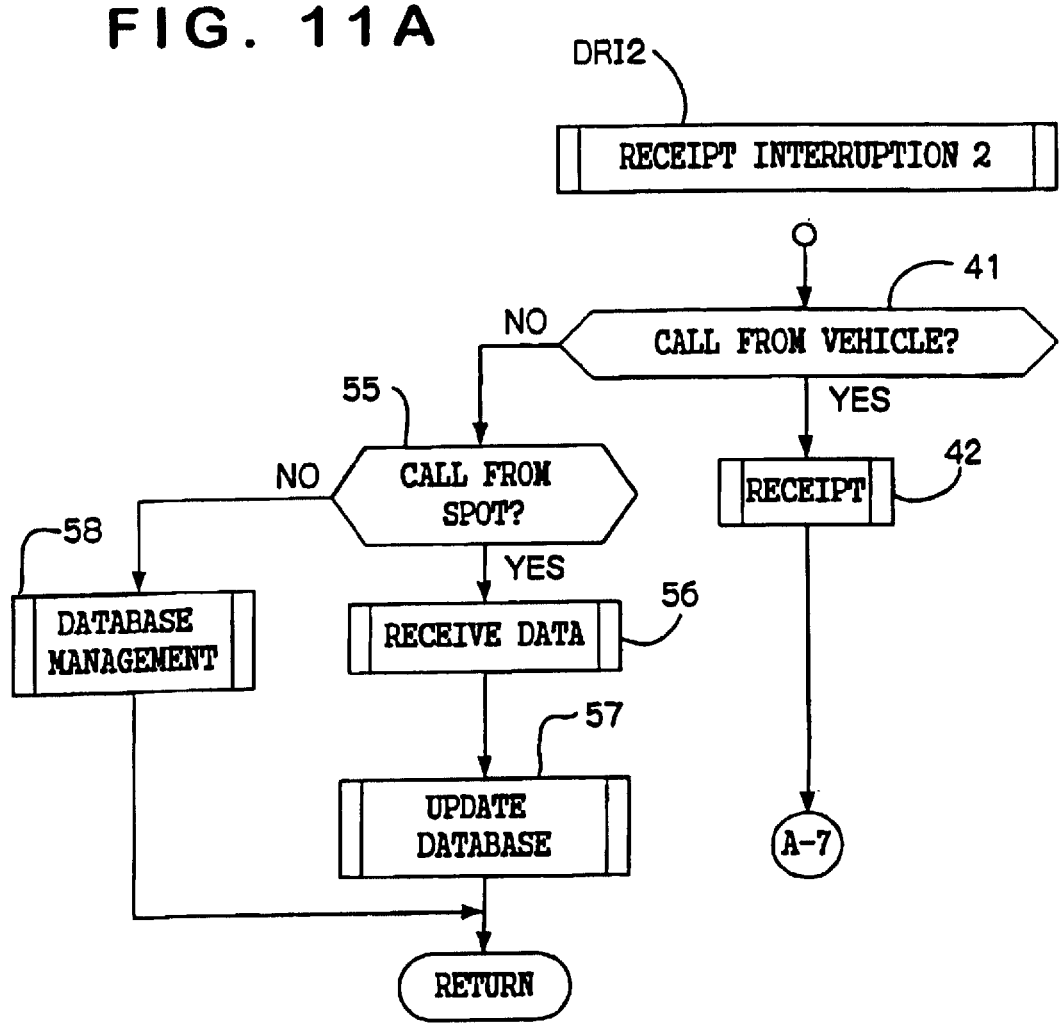

F I G. 1 3
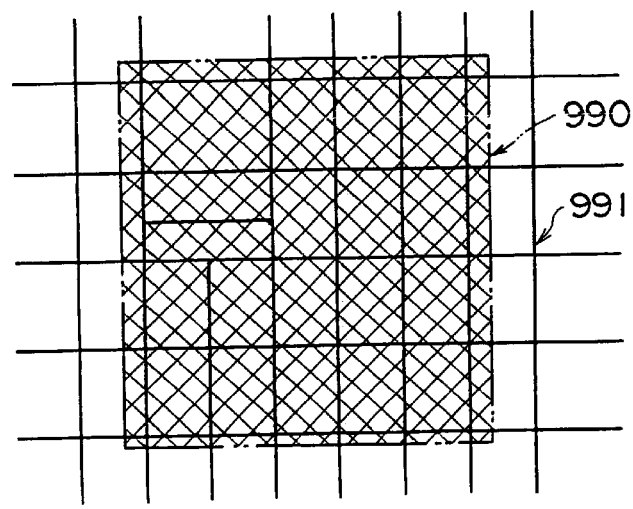
F I G. 1 4
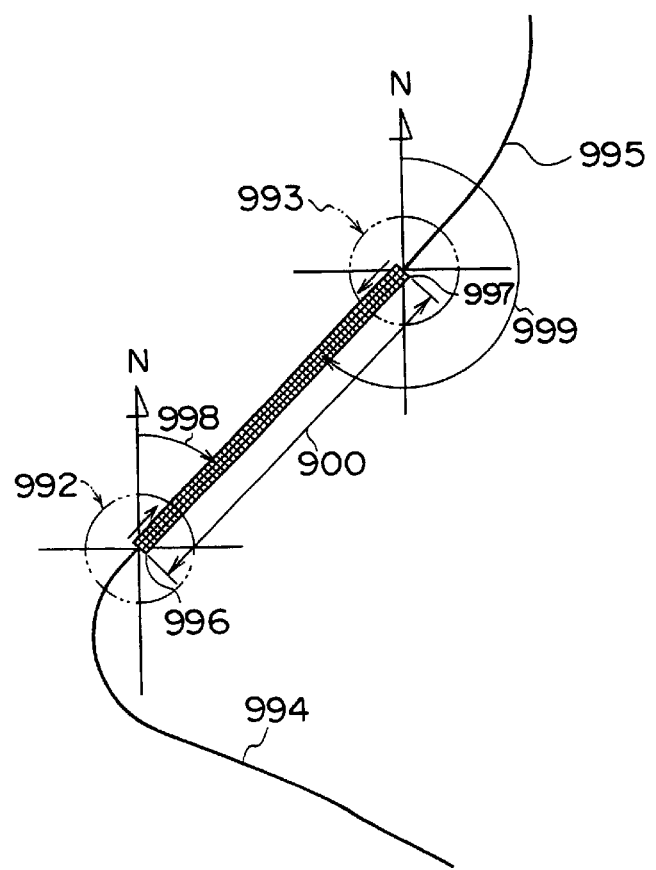

CHARGING SYSTEM WHICH CARRIES OUT DATA PROCESSING FOR FEE PAYMENT

This application is a continuation of PCT/JP00/02437, file Apr. 14, 2000.

TECHNICAL FIELD

The present invention relates to a charging system which carries out data processing for fee payment, when a moving terminal, which is carried by a user or mounted in a moving body, travels through a charge area.

BACKGROUND TECHNOLOGY

Charging systems have been proposed in which vehicle passing judging devices are set on plural routes on toll roads or the like, and it is judged what route of the plural routes has been traveled. One example thereof is disclosed in Japanese Patent Application Laid-Open (JP-A) No. 9-212794. In this type of conventional technique, at the vehicle passing judging device, it is judged which path of plural paths has been traveled. Then, a traveled distance is specified in accordance with the path, and a fee is charged in accordance with the specified traveled distance. The object of this type of system is to broadly spread such road charging to users of the road and to make traffic smooth. However, in this structure, infrastructure costs are required. By using GPS positioning and/or dead reckoning navigating, it is confirmed that a vehicle has traveled through a charge area. By subtracting a charge of that amount from the remaining balance of a prepaid card or an IC card or the like, facilities on the road are substantially eliminated, and charging can be carried out.

Dead reckoning navigating uses a gyro (angular velocity sensor+integration circuit) in order to know the advancing direction, and uses a vehicle speed pulse signal in order to compute the traveled distance. The vehicle speed pulse is a signal at which a signal switches H/L for each given distance, and is utilized in vehicle speed detection and the like. Dead reckoning navigating is mainly used interpolatingly in a case in which positioning using GPS satellite cannot be carried out. A drawback of dead reckoning navigating is that, even if the initial position is accurate, the positional accuracy gradually deteriorates in proportion to the traveled distance. Further, with GPS positioning as well, there are cases in which an error of about 100 m arises. In a general navigation system, the position is corrected and map matching is carried out in accordance with link information (angles, lengths, connections, and the like) of roads in a map database which is stored on a mass storage medium such as a CD-ROM or the like. Namely, the road which is closest to the ground position computed by GPS positioning or dead reckoning navigating is detected on a map, and the ground position information is corrected to the position on that road.

In a case in which an attempt is made to realize charging processing by GPS positioning or dead reckoning navigating, in order to recognize the accurate position, each time a most recently traveled locus is held and a new ground position is computed, the traveled locus must be updated, the computed position must be placed on a map, and that position, which matches the traveled locus, on a road on the map must be detected. Namely, the road, which matches the computed position and the traveled locus, and the position on the road must be specified on a map, and that position must be corrected as the ground position (current position). To this end, a detailed map database is required. However, a charging system, which combines a detailed map database for recognizing an accurate position with GPS positioning and dead reckoning navigating, is extremely expensive, which is an impediment to the popularization thereof.

DISCLOSURE OF THE INVENTION

An object of the present invention is to carry out charging processing which has a relatively high degree of reliability, by using a relatively simple database for specifying positions.

In order to achieve the above object, in a first aspect of the present invention, there is provided a charging system comprising: a GPS positioning device for detecting a position of a moving body; a monitor device which, by using the GPS positioning device, generates information expressing a ground position of the moving body; and a charging processing device which, by using the information, judges whether or not the ground position is within a charge region, and if the charging processing device judges that the ground position is within a charge region, the charging processing device carries out data processing for charging the moving body, wherein the monitor device has simple data including at least absolute positions and configurations of facilities or geographical features which are a cause of GPS positioning impossibility, and when GPS positioning is impossible, by the information which was generated before GPS positioning became impossible, the monitor device detects, from that data, a facility or geographical feature which is a cause of GPS positioning impossibility this time, and changes the detected absolute position of the facility or the geographical feature to that information and makes that information be the current ground position of the moving body.

The charging processing device may have a storage device which stores: a plurality of information for identifying a moving body, which information relate to the moving body; a plurality of charging information which relate to the charge region; and a plurality of moving history information which relate to movement of the moving body. The information for identifying a moving body may include reserve fund information relating to the moving body, and the reserve fund information may hold a current amount which allows the moving body to pay a charge of the charging system. The charging system may further comprise a reading and writing device for reading and writing reserve fund information in the storage device.

When the charging processing device judges, by the monitor device, that the moving body is passing through a charge region, the charging processing device may update the reserve fund information of the storage device by using the reading and writing device. The charging system may further comprise a communications device for communicating with a reporting station which carries out management of the charging system.

In accordance therewith, when GPS positioning becomes impossible, in a case in which the cause thereof is due to a facility or a geographical feature, the monitor device computes the ground position by dead reckoning navigating, which is a positioning device which does not use radio waves such as moving synchronous pulses (vehicle speed pulses). As compared with a case using GPS positioning, the accuracy of the ground position is low. However, the monitor device detects, on the basis of geographical data, a facility or a geographical feature corresponding to the ground position, and corrects the ground position to this position. Thus, an accurate ground position is obtained. On the basis of this ground position, the charging processing device detects whether or not the moving body is in a charge region, and carries out data processing for charging in accordance with passing through the charge region. Thus, the reliability of charging processing improves. It suffices for the geographical data to include positions and configurations of facilities or geographical features (tunnels, roads between mountains, streets of big buildings) where GPS positioning is impossible. A database for specifying positions, which has a small amount of data and is simple and inexpensive, can be used.

In a second aspect of the present invention, there is provided a charging system wherein the geographical data includes data expressing positions of both ends of a radio wave blocked interval of a facility or a geographical feature, and the monitor device detects one end from the geographical data of the radio wave blocked interval corresponding to the ground position detected by the GPS positioning device immediately before GPS positioning became impossible, and the monitor device makes the detected one end be the ground position of the moving body.

In accordance therewith, when the moving body enters into a facility or a geographical feature where GPS positioning is impossible, it is clear that the moving body has entered into one of the both ends thereof, and the ground position can be accurately determined to be the end of the facility or geographical feature where GPS positioning is impossible.

In a third aspect of the present invention, there is provided a charging system comprising a detecting device which detects a moved distance of the moving body without using radio waves of a satellite, wherein, after detecting the one end, the monitor device makes a position of a direction from the one end toward another end which is determined on the basis of the moved distance of the moving body detected by the detecting device, be the ground position.

In this way, until coming out from the facility or geographical feature, it is clear where in that radio wave blocked interval one's own vehicle exists.

In a fourth aspect of the present invention, there is provided a charging system further comprising a detecting device which detects a moved distance of the moving body without using radio waves of a satellite, wherein the geographical data includes data expressing positions of both ends of a radio wave blocked interval of a facility or a geographical feature, and the monitor device detects, from the geographical data, one end of the radio wave blocked interval corresponding to the ground position detected by the GPS positioning device and the detecting device immediately before and immediately after GPS positioning became impossible, and the monitor device makes the detected one end be the ground position of the moving body.

After detecting the one end, the monitor device may make a position of a direction from the one end toward another end which is determined on the basis of the moved distance of the moving body detected by the detecting device, be the ground position.

In this way, by comparing positioning, which is determined by vehicle speed pulses and a gyro immediately before and immediately after GPS positioning is impossible, and positioning by GPS, correction of the positioning by the vehicle speed pulses of one's own vehicle by vehicle speed pulses and the gyro in the radio wave blocked interval can be carried out more accurately.

A charging system is provided in which, in a case in which GPS positioning is impossible by the monitor device, when the radio wave blocked interval cannot be detected and the moved distance of the moving body detected by the detecting device exceeds a predetermined threshold value, the charging processing device stores abnormality information in the storage device. The abnormality information stored in the storage device may be transmitted to the reporting station by a communications device.

In this way, the abnormality information of the storage device (moving history table) is automatically emitted, and the charging management station receives the information, and can carry out monitoring of improper charging or leaks in charging.

In a fifth aspect of the present invention, there is provided a charging method comprising: (a) a step of detecting a position of a moving body; (b) a step of generating information expressing a ground position of the moving body, by using the position of the moving body which was detected in step (a); (c) a step of judging, by using the information, whether or not the ground position is within a charge region, and in a case in which it is judged that the ground position is within the charge region, carrying out data processing for charging the moving body in accordance with travel through the charge region, wherein in step (b), when GPS positioning is impossible, by the information generated before GPS positioning became impossible, a facility or geographical feature which is a cause of GPS positioning impossibility this time, is detected from simple data including at least absolute positions and configurations of facilities or geographical features which are a cause of GPS positioning impossibility, and the detected absolute position of the facility or the geographical feature is changed to that information and that information is made to be the current ground position of the moving body.

In accordance with this method, when GPS positioning becomes impossible, in a case in which the cause thereof is due to a facility or a geographical feature, the ground position is computed by dead reckoning navigating. As compared with GPS positioning, the accuracy of the ground position is low. However, a facility or a geographical feature corresponding to the ground position is detected on the basis of geographical data, and the ground position is corrected to this position. Thus, an accurate ground position is obtained. On the basis of this ground position, it is detected whether or not the moving body is in a charge region, and data processing for charging in accordance with passing through the charge region is carried out. Thus, the reliability of charging processing improves. It suffices for the geographical data to include positions and configurations of facilities or geographical features (tunnels, roads between mountains, streets of big buildings) where GPS positioning is impossible. A database for specifying positions, which has a small amount of data and is simple and inexpensive, can be used.

BRIEF DESCRIPTION OF THE DRAWINGS

FIG. 7 is a flowchart showing the contents of "vehicle entry processing" 27 shown in FIG. 6.

FIG. 8 is a flowchart showing the contents of "intermediate processing" 28 shown in FIG. 6.

FIG. 13 is a plan view showing a charge area (990) set at a road network (991).

FIG. 14 is a plan view showing end positions p1 (996), p2 (997) and directions D1 (998), D2 (999) of a tunnel on a map.

BEST MODE FOR IMPLEMENTING THE INVENTION

Figure 1:
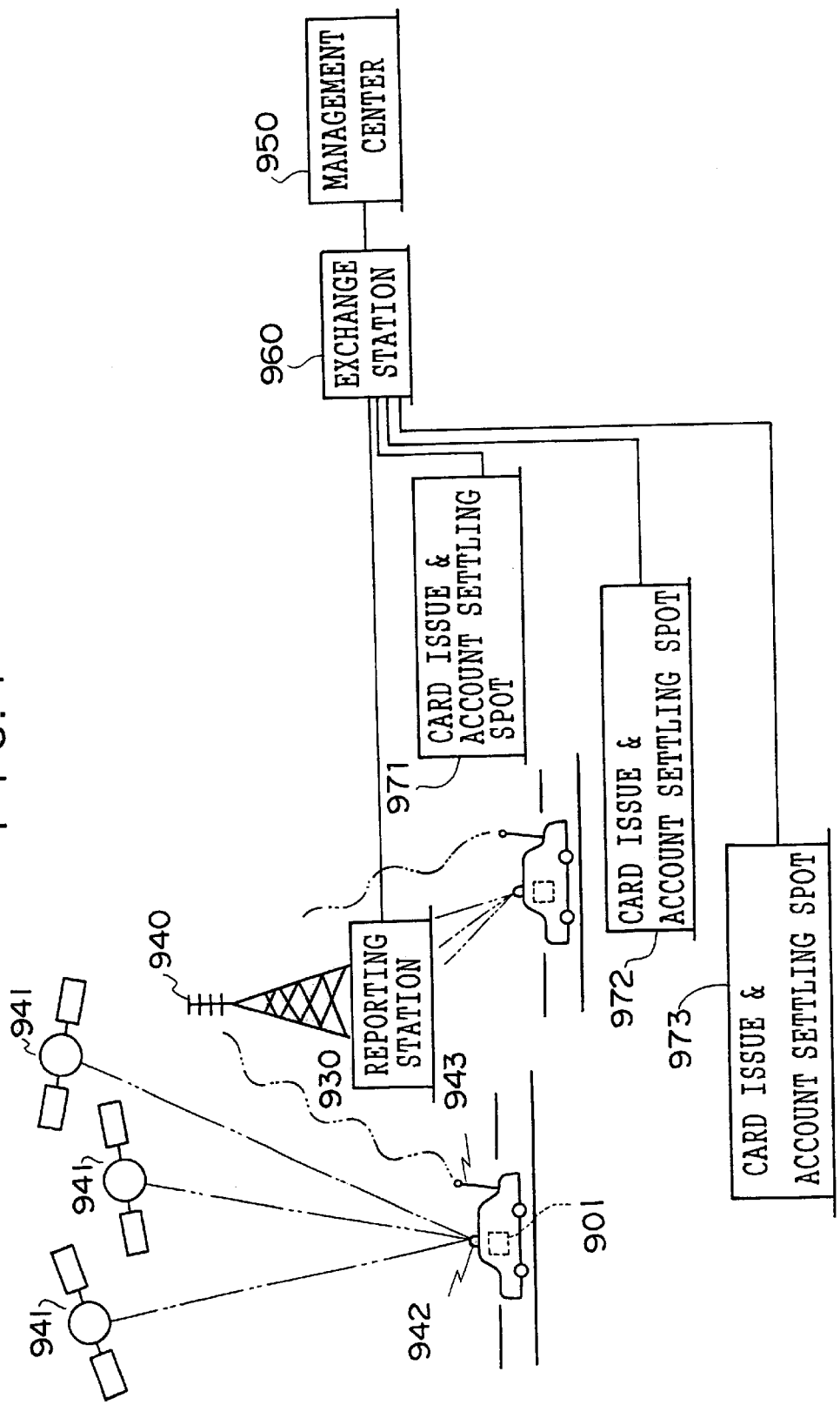
FIG. 1 is a block diagram showing a summary of a system structure of an embodiment of the present invention.

Other objects and features of the present invention will become clear from the following explanation referring to the drawings.

FIG. 1 shows a system structure of an embodiment of the present invention. A vehicle-mounted charging device 901 which is mounted in a vehicle communicates, via a built-in telephone unit 908 (to be described later) and an antenna ANTt (943), with a reporting station 930 (management station) so as to exchange data. Further, radio waves from satellites (941) are received at a GPS antenna ANTg (942), and the position and traveling direction of the vehicle are recognized by a GPS positioning device (920 through 928: to be described later) and are displayed together with a simple map showing the traveling place. In a case in which satellites (941) which can receive are insufficient or receipt of radio waves from the satellites (941) is not possible, the insufficient information is compensated for by vehicle position computation by direction detection using a gyro and accumulation of the traveling speed. Or, vehicle position recognition is carried out.

Figure 2:
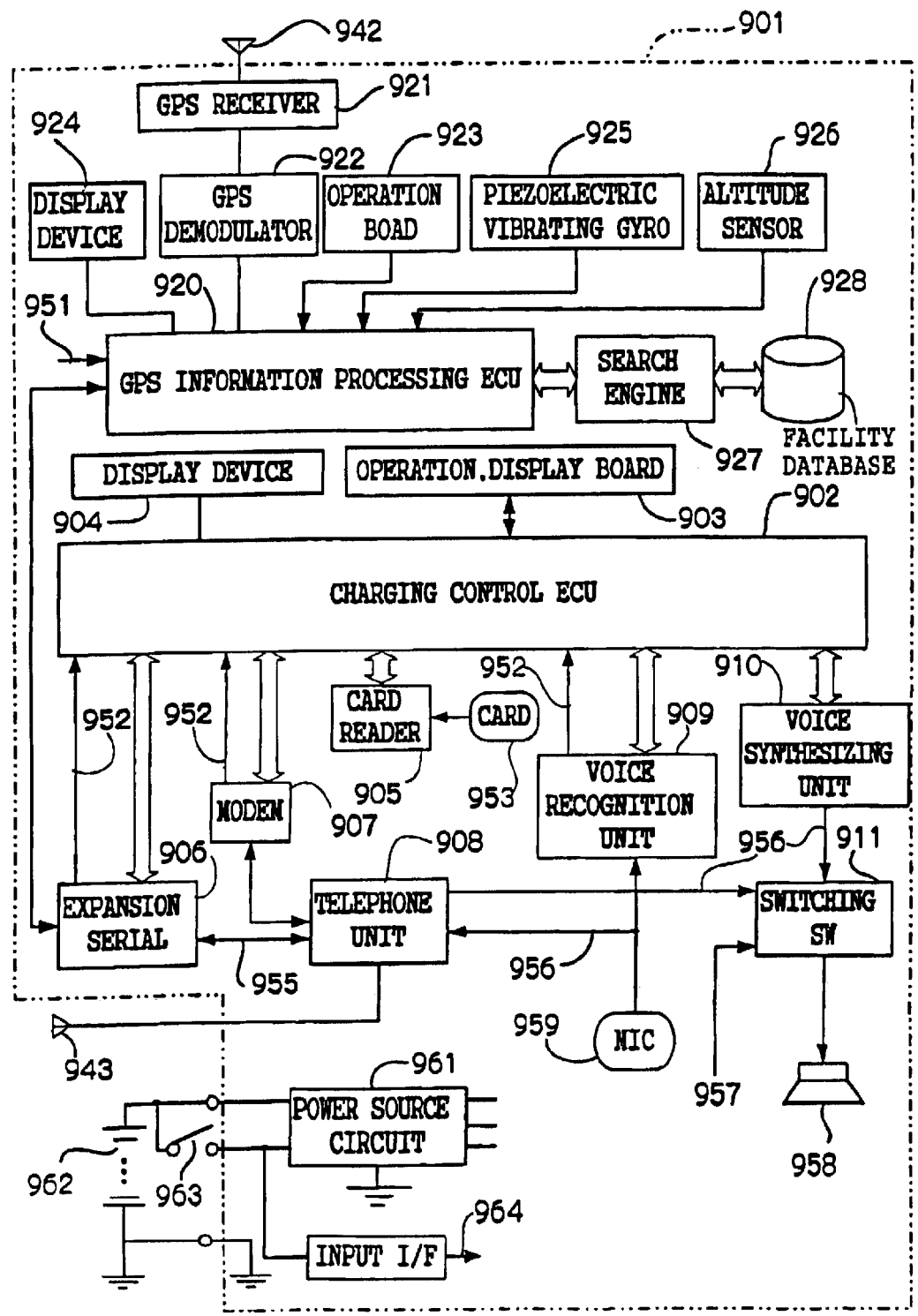
FIG. 2 is a block diagram showing a structure of a vehicle-mounted charging device shown in FIG. 1.

FIG. 2 shows the structure of the vehicle-mounted charging device 901. With reference to FIG. 2, direct current voltage is always applied to the vehicle-mounted charging device 901 from a battery 962 in the vehicle. A power source circuit PSC 961 provides operation voltage to the CPUs of a GPS information processing ECU 920 and charging control ECU 902. In this way, data is always held (stored) in an internal memory of the CPU of the charging control ECU 902 and in an internal memory which is outside of the CPU but is within the charging control ECU 902.

When an ignition switch IGsw 963 of the vehicle is closed, the power source circuit PSC 961 provides operation voltage to all of the circuits of the vehicle-mounted charging device 901. Opening of the ignition switch IGsw 963 (Si (964 in the drawing)=L) instructs stopping (discontinuing) of measurement of the staying time in the charge area (charge area), and closing (Si=H) instructs continuing of measurement of the staying time within the charge area.

The GPS positioning device (920 through 928) includes a receiving antenna ANTg (942), a GPS receiver 921, a GPS demodulator 922, a display device 924, a piezoelectric vibrating gyro 925, an altitude sensor 926, the GPS information processing ECU (electronic control device) 920, an operation board 923, a search engine 927, and a facility database 928. The 1.57542 GHz radio waves sent from each satellite (941) of the GPS are received at the GPS receiver 921 via the receiving antenna ANTg (942), and the information carried by the radio waves, i.e., the information such as functions expressing the loci of the satellites (941), the time and the like, is demodulated at the GPS demodulator 922, and is inputted to the GPS information processing ECU 920. The GPS information processing ECU 920 is a computer system which centers around a CPU and which is equipped with an almanac data memory and a memory for data buffer and an input/output interface (electric, electronic circuits). On the basis of the information sent from the GPS satellites (941), the CPU generates information (latitude, longitude, altitude) expressing the position of one's own vehicle, and computes the advancing direction and the advancing speed of one's own vehicle on the basis of the progress over time of the position information. In accordance with the position information which the CPU generates, the search engine 927 reads-out, from the facility database 928, one page (one screen) of simple map data which includes that position, and displays that map on the display device 924, and displays, at the current position on the map, a current position indicator which shows the advancing direction.

Each page of data of the map data of the facility database 928 includes a data group which expresses the coordinate values of diagonal corners of one page, map image data within that page, the positions of both ends and the directions of respective ends of facilities or geographical features (e.g., tunnels) which are in a region which is expressed by that page, and at which receipt of GPS radio waves is not possible, and which span a length which is greater than or equal to a set length. For example, in a case in which there is a tunnel which is between roads r1 994 and r2 995 shown in FIG. 14 and whose length of a radio wave blocked portion is L 900, the position of one end p1 996 thereof, a moving direction D1 998 advancing into the tunnel at the one end p1 996 from the road r1 994, and the length L 900 are one data group addressed to the one end p1 996 of the tunnel. The position of another end p2 997, a moving direction D2 999 advancing into the tunnel at the other end p2 997 from the road r2 995, and the length L 900 are one data group addressed to the other end p2 997 of the tunnel. These data groups are included in one page of map data.

A program is accessory to the CPU of the GPS information processing ECU 920. In response to a data transfer request from the charging control ECU 902, the program transfers, to the charging control ECU 902, information relating to the position (ground position), speed, direction, and date and time of the vehicle (the vehicle-mounted charging device 901) and the success or failure of GPS positioning, and reads the charge region information the charging control ECU 902 has transferred in, and stores the information in an internal memory, and superposes a charge area (990) display (grid) on a region, i.e., charge region, which is stipulated by the charge region information on the displayed map on the display device 924.

The analog signals, which the piezoelectric vibrating gyro 925 and the altitude sensor 926 output, are respectively inputted to the GPS information processing ECU 920. The CPU of the ECU 920 converts the signals to digital data via an A/D converter and reads the data. The information outputted from the GPS demodulator 922 and the information controlling the GPS demodulator 922 are inputted to the CPU or outputted from the CPU via an I/O port of the GPS information processing ECU 920.

The GPS information processing ECU 920 computes three-dimensional coordinates Ux, Uy, Uz of the position of one's own vehicle by a known "three satellite positioning computation" or "four satellite positioning computation". When the ground position information is computed by GPS positioning, the GPS information processing ECU 920 computes the advancing direction and the advancing speed of the vehicle in comparison with the ground position computed the previous time, and on the basis of the ground position computed this time, reads out, from the facility database 928, one page (one screen) of map data including that position, and displays on the display device 924 a map expressed by the map data, and displays, at the current position on the displayed map, a current position indicator showing the advancing direction as well. Then, when at least one portion of the region, i.e., the charge region, which is stipulated by the charge region information received from the charging control ECU 902 and saved in the internal memory, is included in the map region on the display device 924, the GPS information processing ECU 920 superposes the charge area (990) display (grid) on that region on the display screen. By this added display, the driver can recognize the charge region on the display surface of the display device 924.

The charging control ECU 902 also is a computer system which is centered around a microprocessor (CPU) and which is equipped with an input/output interface (electric, electronic circuits) The CPU can transmit and receive various types of information to and from the reporting station 930 via the antenna ANTt (943), the telephone unit 908 and a modem 907. An expansion serial input/output port 906 carries out serial input and output 955 of data and serial/parallel conversion input and output.

The voice of the driver inputted by a microphone MIC 959 is, via a voice recognition unit 909, converted into digital data expressing letters of words, and is inputted to the CPU of the charging control ECU 902. Further, as needed, the CPU reports (speaks) a message (output information) to the driver at a vehicle-mounted speaker SP 958 via a voice synthesizing unit 910 and a switching switch SW 911. When voice data is outputted from the CPU, the switching switch SW 911 switches the connection of a vehicle-mounted audio 957 and the speaker SP 958 to the connection of the voice synthesizing unit 910 and the speaker SP 958. At this time, the CPU simultaneously displays, in letters on a display device 904, the message which is transmitted by voice 956 to the driver by the vehicle-mounted speaker SP 958. In this way, the driver can aurally and visually confirm the message from the CPU.

A card reader 905 (reading and writing device), which carries out reading and writing of data with respect to an IC card CRD 953 (storing device), is connected to the charging control ECU 902. When the IC card CRD 953 is inserted into a card insertion slot of the card reader 905, and when the charging control ECU 902 requests data transfer, the stored data of the card CRD 953 is read and is transferred to the charging control ECU 902. When write data is received from the charging control ECU 902, the card reader 905 overwrites (updatingly writes) the data on the IC card CRD 953. Stored information of the IC card CRD 953 is shown in Table 1. The example shown in Table 1 shows that a one-time issue amount of the card is ¥10,000, that the cardbalance is ¥10,000 (unused), that the card ID given by the issuer is MYCAR003, that the vehicle type classification which was applied for is compact vehicle, and that the vehicle ID (in this example, the number listed on the license plate) is A123B568. Further, the data of the charge table relates to the charge area which the driver desires (has applied for) immediately after issue of the card. This is written by the issuer in accordance with the application. If there is no application (request for writing) at the time of issue, writing is not carried out.

TABLE 1

Data Stored in Card

| item of information | contents of information |
|---|---|
| card ID | MYCAR003 |
| card balance | ¥10,000 |
| vehicle type classification | compact vehicle |
| vehicle ID | A123B568 |
| charge table | . . . (Table 2) |

Three examples of data of charge tables are shown in Tables 2 through 4. The time unit charge table shown in Table 2 charges fees corresponding to existing time in an area, other than parking, for a vehicle in a charge area which is expressed by charge region information. The distance unit charge table shown in Table 3 charges fees corresponding to a traveled distance in a charge area. Further, the per entry charge table shown in Table 4 charges fees corresponding to the number of times of entry (use).

TABLE 2

Time Unit Charge Table

| item of information | contents of information | | | | | |
|---|---|---|---|---|---|---|
| charge region information | [N350000, E1360000] (first point) [N345900, E1360100] (second point) | | | | | |
| charge | large-sized | | regular | | compact | |
| information/ 1 hour | first hour | after 1 hour | first hour | after 1 hour | first hour | after 1 hour |
| time period 7:00 to 9:00 | ¥500 | ¥450 | ¥300 | ¥250 | ¥200 | ¥150 |
| time period 17:00 to 19:00 | ¥500 | ¥450 | ¥300 | ¥250 | ¥200 | ¥150 |
| other time periods | ¥400 | ¥350 | ¥200 | ¥150 | ¥100 | ¥50 |
| table effective period | October 10-11, 1997 | | | | | |
| table effective region information | . . . (first point) . . . (second point) | | | | | |

TABLE 3

Distance Unit Charge Table

| item of information | contents of information | | | | | |
|---|---|---|---|---|---|---|
| charge region information | [N350000, E1360000] (first point) [N345900, E1360100] (second point) | | | | | |
| charge | large-sized | | regular | | compact | |
| information/ 1 km | first 1 km | after 1 km | first 1 km | after 1 km | first 1 km | after 1 km |

TABLE 3-continued

Distance Unit Charge Table

| time period 7:00 to 9:00 | ¥500 | ¥450 | ¥300 | ¥250 | ¥200 | ¥150 |
|---|---|---|---|---|---|---|
| time period 17:00 to 19:00 | ¥500 | ¥450 | ¥300 | ¥250 | ¥200 | ¥150 |
| other time periods | ¥400 | ¥350 | ¥200 | ¥150 | ¥100 | ¥50 |
| table effective period | October 10–11, 1997 | | | | | |
| table effective region information | . . . (first point) . . . (second point) | | | | | |

TABLE 4

Per Entry Charge Table

| item of information | contents of information | | |
|---|---|---|---|
| charge region information | [N350000,E1360000] (first point) [N345900,E1360100] (second point) | | |
| charge information/ 1 time | large-sized | regular | compact |
| time period 7:00 to 9:00 | ¥500 | ¥300 | ¥200 |
| time period 17:00 to 19:00 | ¥500 | ¥300 | ¥200 |
| other time periods | ¥400 | ¥200 | ¥100 |
| table effective period | October 10–11, 1997 | | |
| table effective region information | . . . (first point) | . . . (second point) | |

The data of one group (one point) of the charge region information in the charge table is position information expressing one point on the contour of the charge area. In cases in which only data of two groups (data of two points) exist, the data of the respective groups mean the positions of diagonal corners of a square, and the charge area is square. An example thereof is shown in FIG. 13. In FIG. 13, the grid designated by 990 shows the charge area, and the lines designated by 991 show a road network.

Cases in which there are data of three or more groups mean that the polygonal region, which is expressed by connecting the positions (points) expressed by the data of the respective groups in the order in which the data groups are written and by connecting the final point and the initial point, is the charge area. Because there are two groups of position (point) data in the examples of Table 2 through Table 4, the charge areas are square. The charge information is provided for respective time periods and for the respective vehicle type classifications.

The table effective period means the effective period of the data. The table effective region information expresses a contour, which is a substantially similar shape as the charge area and which is wider, by substantially 600 m or so, than the contour of the charge region stipulated by the charge region information. In a case in which a plurality of charge areas are set, the table effective region information is for making the vehicle select the charge table of the charge area which is close to the vehicle.

The card issue & account settling spots (card issue & account settling places) 971 through 973 shown in FIG. 1 issue the IC card CRD 953. These spots (handling places) are provided at places which are extremely close to the region at which the charge area is set and which are easily accessed by the driver, and which are in the vicinity of the reporting station 930, or within a region of jurisdiction of the reporting station 930, or outside of the region of jurisdiction, or the like. For example, these spots may be provided at a municipal office or a branch municipal office of the region in which the charge area is set. At these spots, new issuing of IC cards, reissuing in the case of loss, settling of unpaid amounts (a negative card balance), adding of a deposit (added amount of the card balance) are carried out in accordance with the driver's wishes by an agent or an automatic vending machine. When these processings are carried out, the processing data is transmitted to the reporting station 930 via a public line and the exchange station 960. In cases of new issuance, reissuance in the case of loss, and adding of a deposit, the reporting station 930, in accordance with the received processing data, updates the data of a monitoring database WDB 936, and in the case of settling an unpaid amount, updates the data of a nonpayment database CDB 935.

Figure 3:
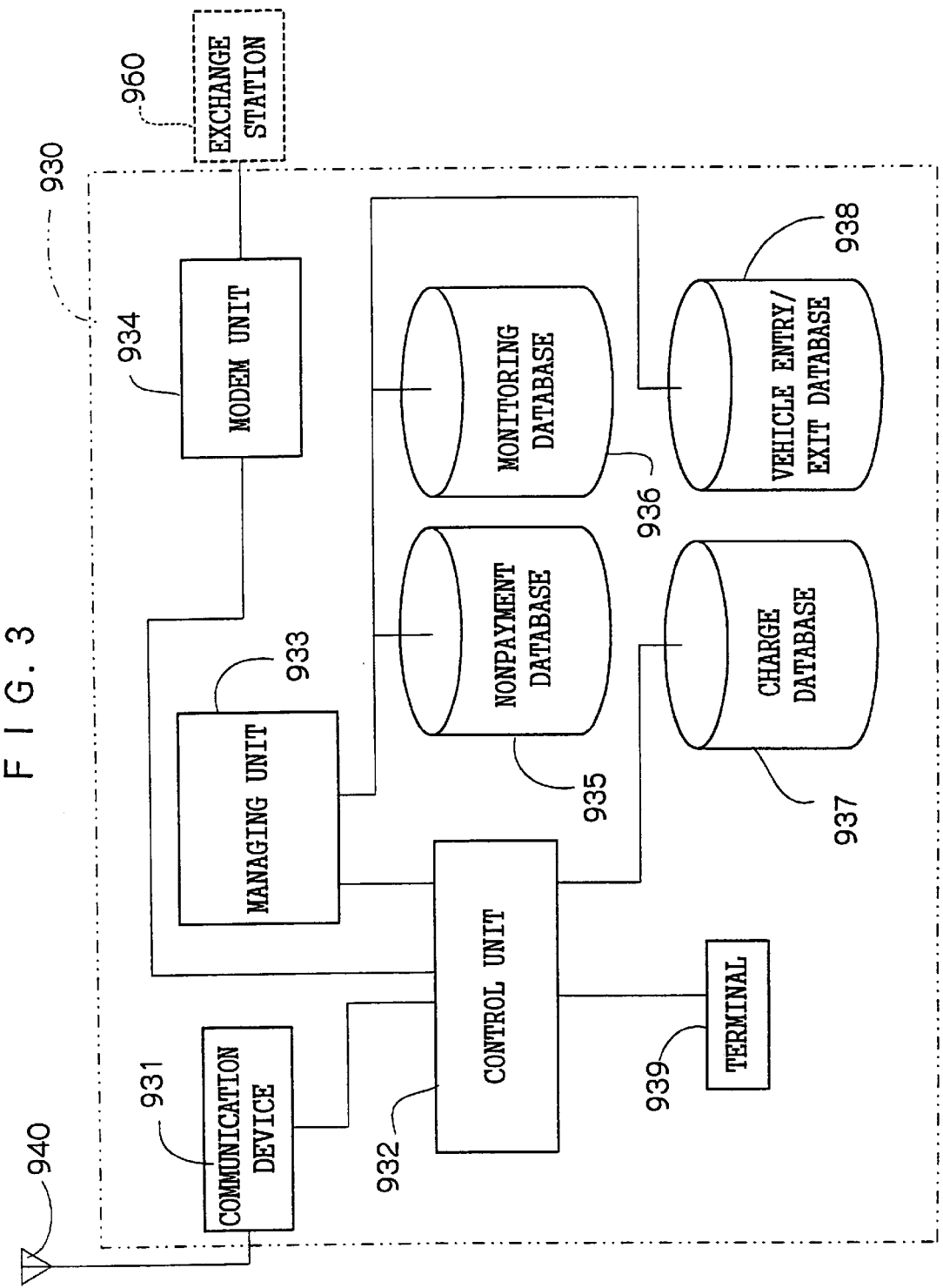
FIG. 3 is a block diagram showing a structure of a reporting station 30 shown in FIG. 1.

FIG. 3 shows the structure of the reporting station 930. At the reporting station 930, there is a wireless communication device 931 which modulates the transmitted data from a controller 932 to a radio wave signal and sends it to an antenna 940, and which receives radio waves via the antenna 940 and demodulates the received data and supplies it to the controller 932. The controller 932 is a computer system which centers around a microprocessor (MPU) and which is equipped with an input/output interface. A terminal (a complete set of a personal computer, a display, a keyboard, a mouse and a printer) PC 939, a charge database (memory) FDB 937, and an information managing unit 933 are connected to the controller 932. The nonpayment database CDB 935, the monitoring database WBD 936, and a vehicle entry/exit database TBD 938 are connected to the information managing unit 933.

A modem 934 is connected to the controller 932. The controller 932 can carry out voice 956 and data communications with the management center 950 (FIG. 1) via the modem and an exchange station 960 (FIG. 1) of a public communication line.

Figure 4A:
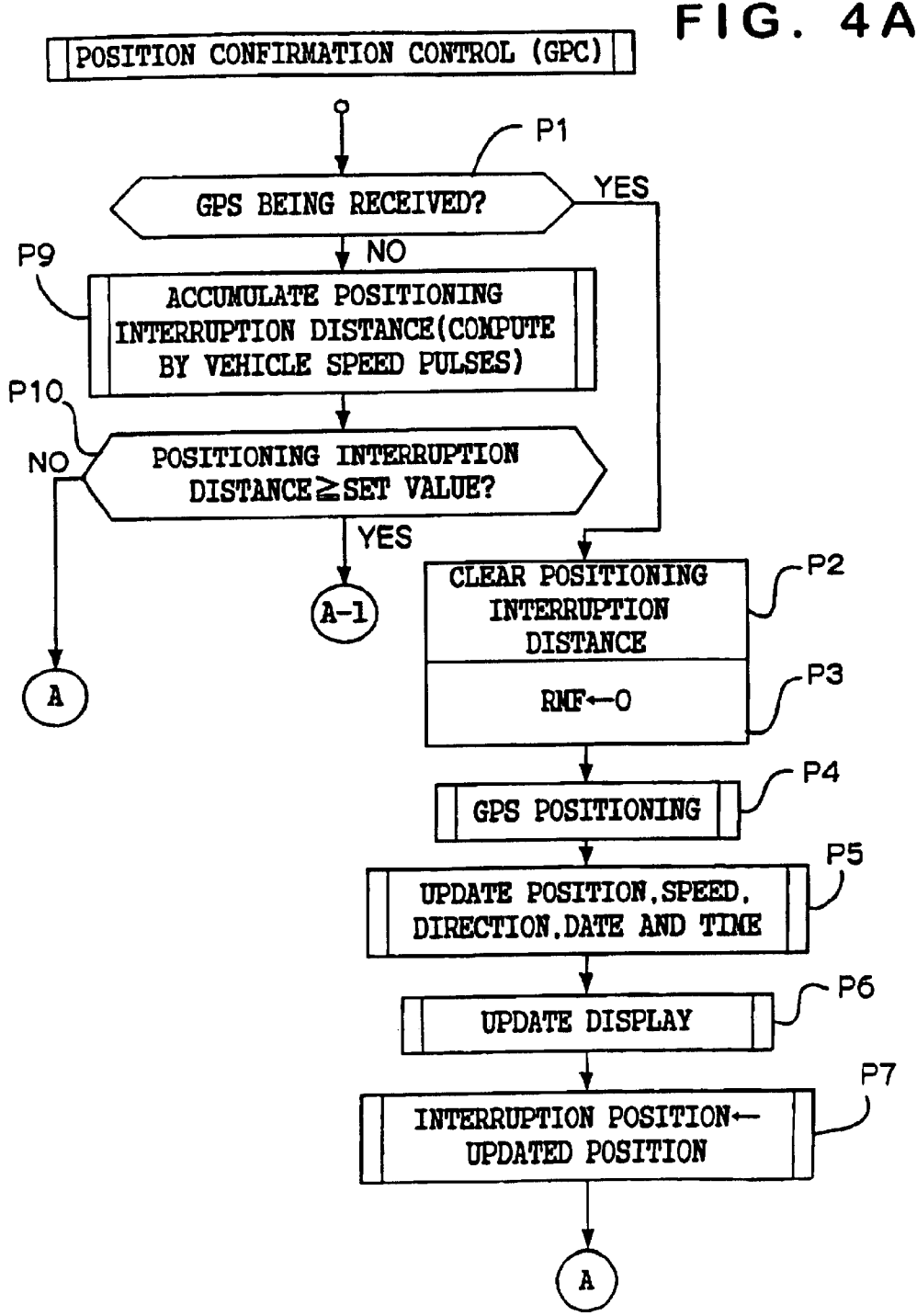
FIG. 4 is a flowchart showing functions of position confirmation control GPC of a GPS information processing ECU 920 shown in FIG. 2.
Figure 4B:
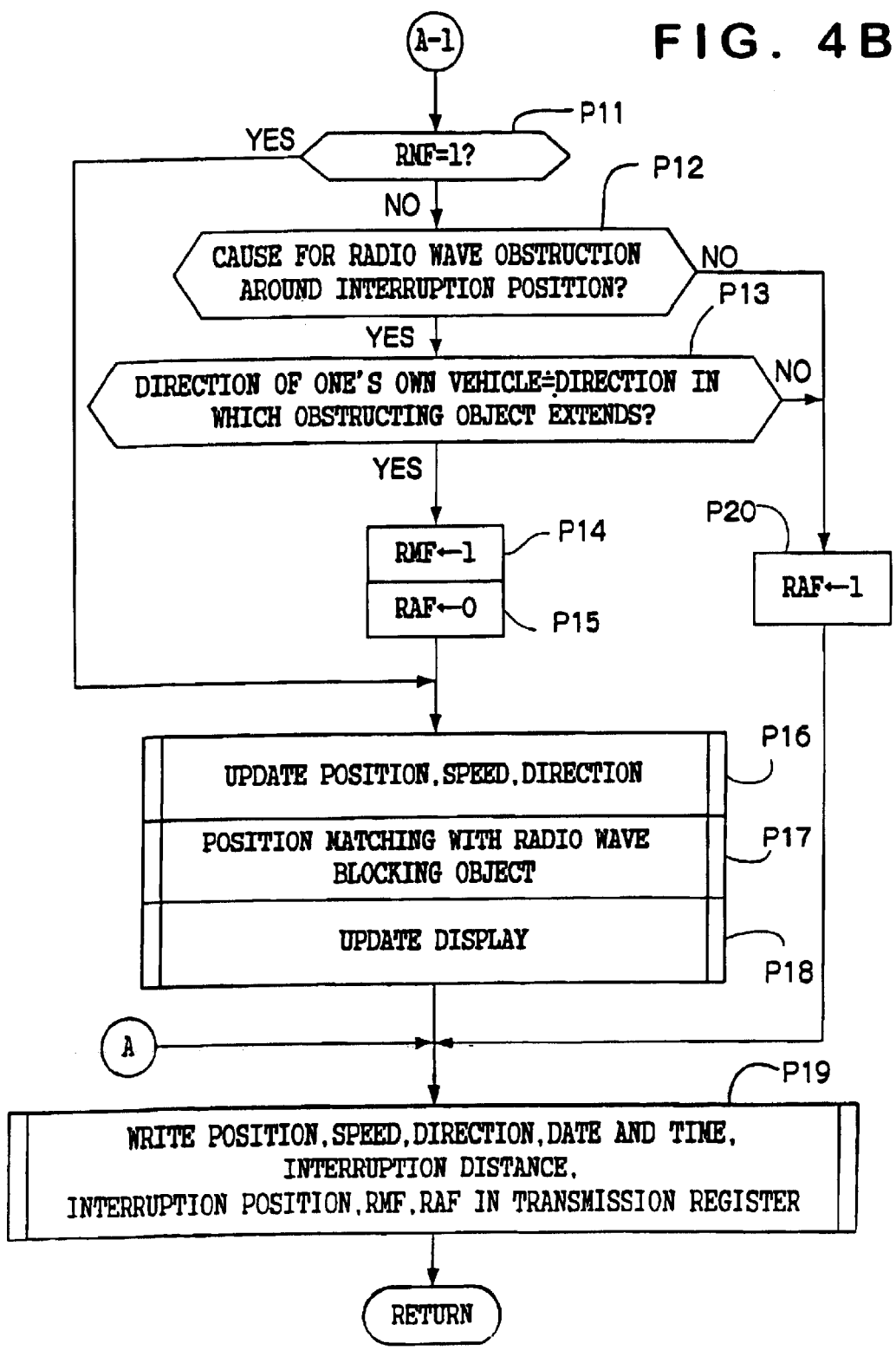

The summary of "position confirmation control" GPC of the GPS information processing ECU 920 is shown in FIG. 4. This control is repeated at fixed periods. When proceeding into this "position confirmation control" GPC, the (CPU of the) ECU 920, when GPS positioning is possible, clears (the register that writes) a positioning interruption distance and clears a register RMF (steps P1 through P3). Note that, hereinafter, in the parentheses, the word step will be omitted, and only the step No. number will be written. The ground position is computed at "GPS positioning" (P4), and on the basis of the position computed this time and the position computed the previous time, the speed and the direction are computed (P5). Then, on the basis of the ground position computed this time, map data of one page (one screen) which includes this position is read out from the facility database 928, and a map expressed by this map data is displayed on the display device 924, and a current position indicator expressing the advancing direction as well is displayed at the current position on the display map (P6). Then, the interruption position is updated to the ground position obtained this time (P7). Namely, the position computed this time is written in the interruption position register. During the time when GPS positioning is possible, the ECU 920 repeats the above-described processings at fixed periods.

When GPS positioning becomes impossible, the ECU 920 starts measurement of the positioning interruption distance (P9), and thereafter, provided that the impossibility of GPS positioning continues, at each fixed period, the ECU 920 counts the number of generated vehicle speed pulses 951 and converts the number into a distance value, and carries out, at fixed periods, interruption distance accumulation, which accumulates and writes the distance value in the positioning interruption distance register, and checks whether the positioning interruption distance (accumulated value) has reached a set value (P10). The set value here is a short distance value for ignoring the interruption of radio wave receipt in a temporary short time. When the positioning interruption distance is the set value or more, it is thought that there are causes of trouble with the radio waves in the vehicle or on the ground, and it is checked whether there is a facility or a geographical feature, in the map displayed on the display device 924, at which GPS positioning is not possible (P12).

Specifically, the position immediately before GPS positioning becomes impossible is written in step P7 in the interruption position register. Thus, it is detected whether the end position data (corresponding to p1 996, p2 997 in FIG. 14) of a radio wave blocked facility or geographical feature, which is included in a region within a circle of a radius set around this position, (992, 993), is in the data group belonging to the map which is currently being displayed (P11, P12).

Here, using a case, in which it is detected that p1 996 in FIG. 14 is applicable, as an example, next, it is checked whether the traveling direction of one's own vehicle is substantially the same as the direction D1 998 affiliated with p1 996 (P13). When they are substantially the same, the position at which GPS positioning becomes impossible (the data in the interruption position register) is considered to be p1 996 (FIG. 14). A "1", which expresses that the vehicle is in an on-ground radio wave obstructed facility or geographical feature, is written into a register RMF, and a "0", which means that the cause of impossibility of GPS positioning is on the ground, is written into a register RAF (P14, P15). Updating computation of the ground position (current position), speed, and direction by dead reckoning navigating is carried out (P16). Then, the ground position (current position) is updated to a position which is ahead of the position p1 996 on the map, by an amount corresponding to the positioning interruption distance, in the direction D1 998 (P17). Then, on the basis of the ground position computed this time, one page (one screen) of map data which includes this position is read-out from the facility database 928, and a map expressed by the map data is displayed on the display device 924, and a current position indicator expressing the advancing direction as well is displayed at the current position on the display map (P18).

The position, speed, direction, date and time, positioning interruption distance, and interruption position which are computed or set in this way, as well as the data of the registers RMF, RAF are written into a transmission register which stores data for data transfer to the charging control ECU 902 (P19).

At the time of above-described detection of a radio wave obstructed facility or geographical region, if such a position (p1 996, p2 997 in FIG. 14) does not exist and if such a position has tentatively been detected but the vehicle advancing direction is different from the direction data thereat (D1 998, D2 999), a "1", which means that the cause of impossibility of GPS positioning does not exist on the ground, i.e., that the cause of impossibility of GPS positioning exists in the vehicle (e.g., an intentional blocking of the GPS antenna), is written in the register RAF (P20).

Figure 5A:
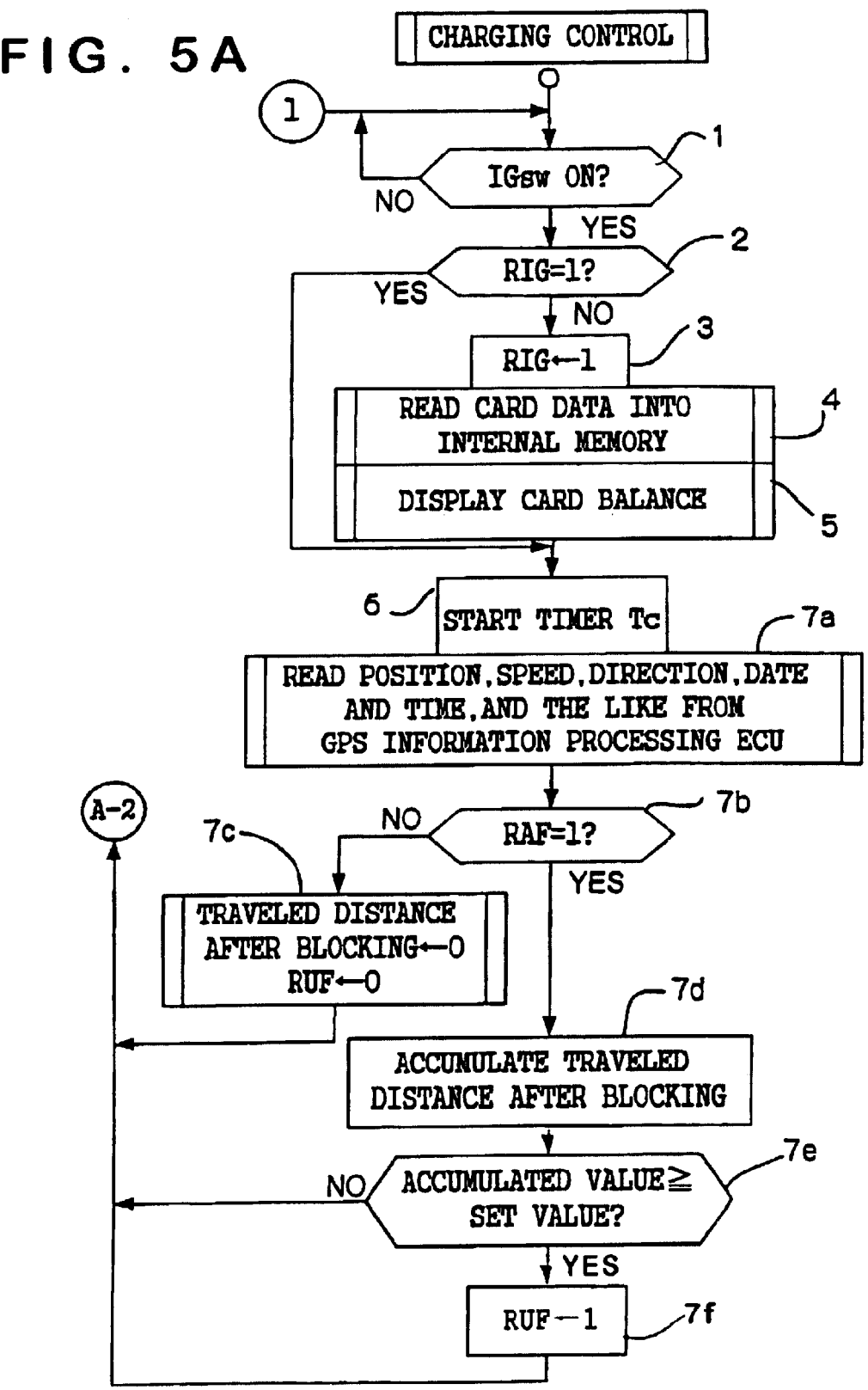
FIG. 5 is a flowchart showing a portion of charging control operation of a charging control ECU 902 shown in FIG. 2.
Figure 5B:
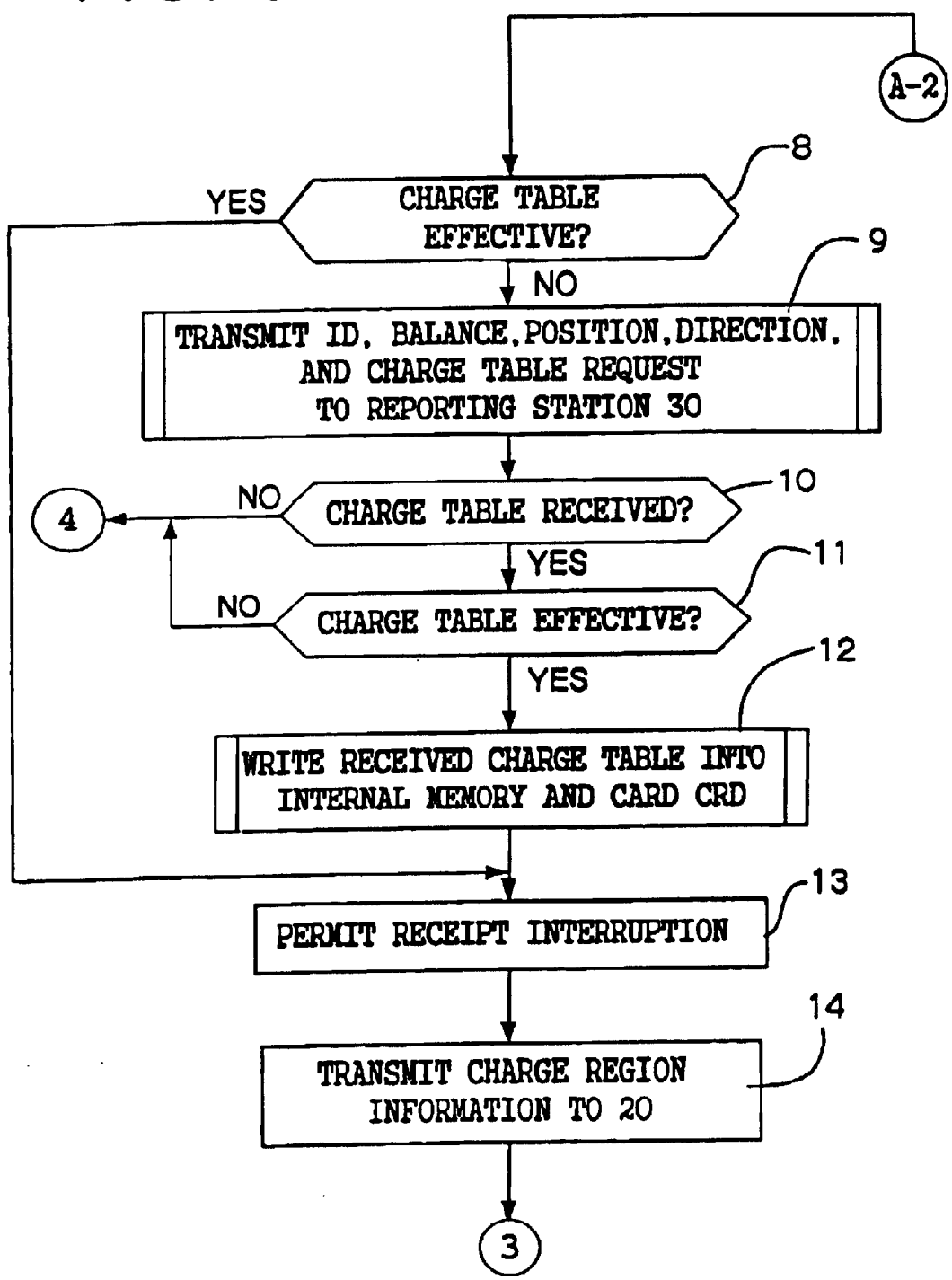
Figure 6A:
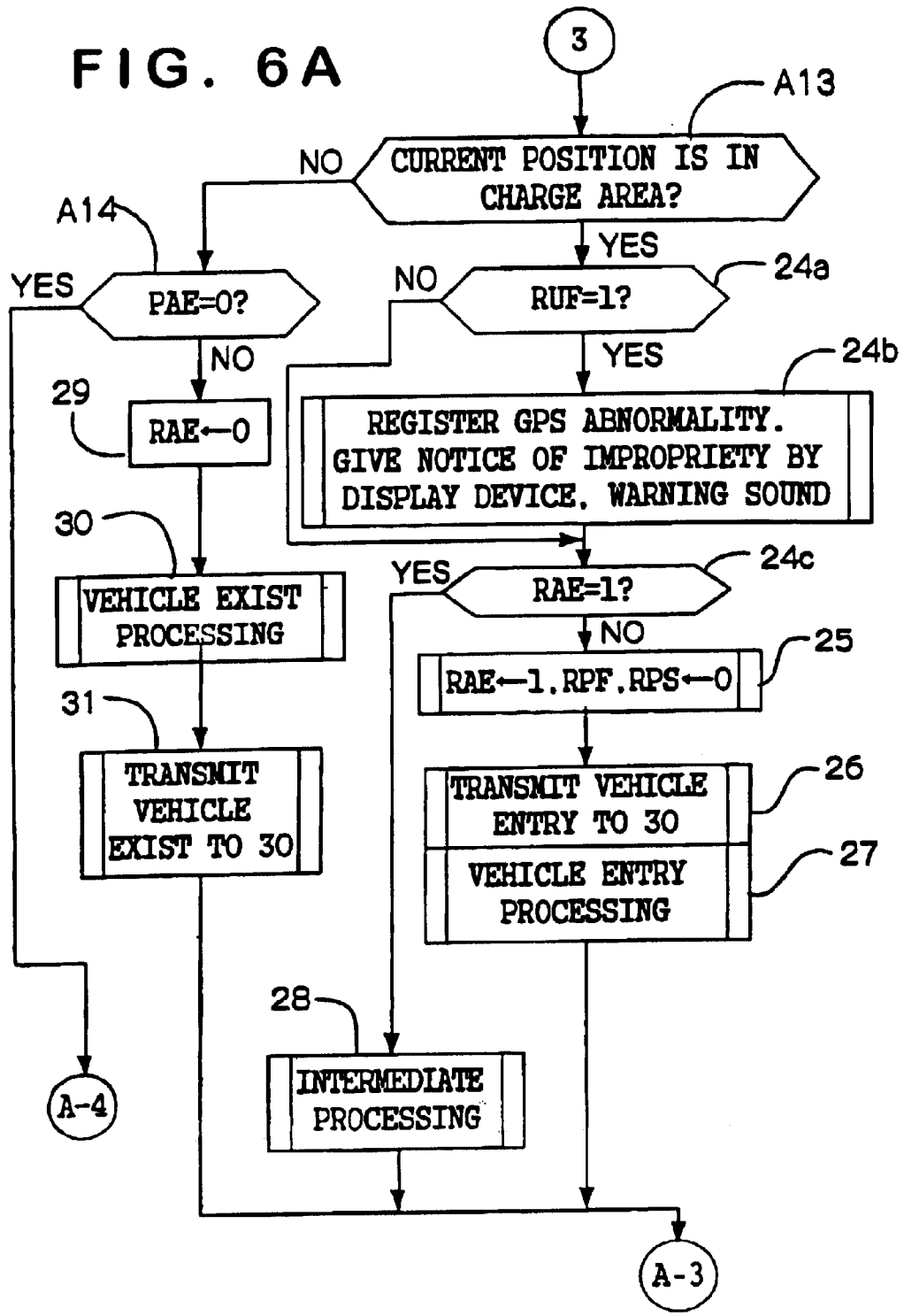
FIG. 6 is a flowchart showing the remaining portions of the charging control operation of the charging control ECU 902 shown in FIG. 2.
Figure 6B:
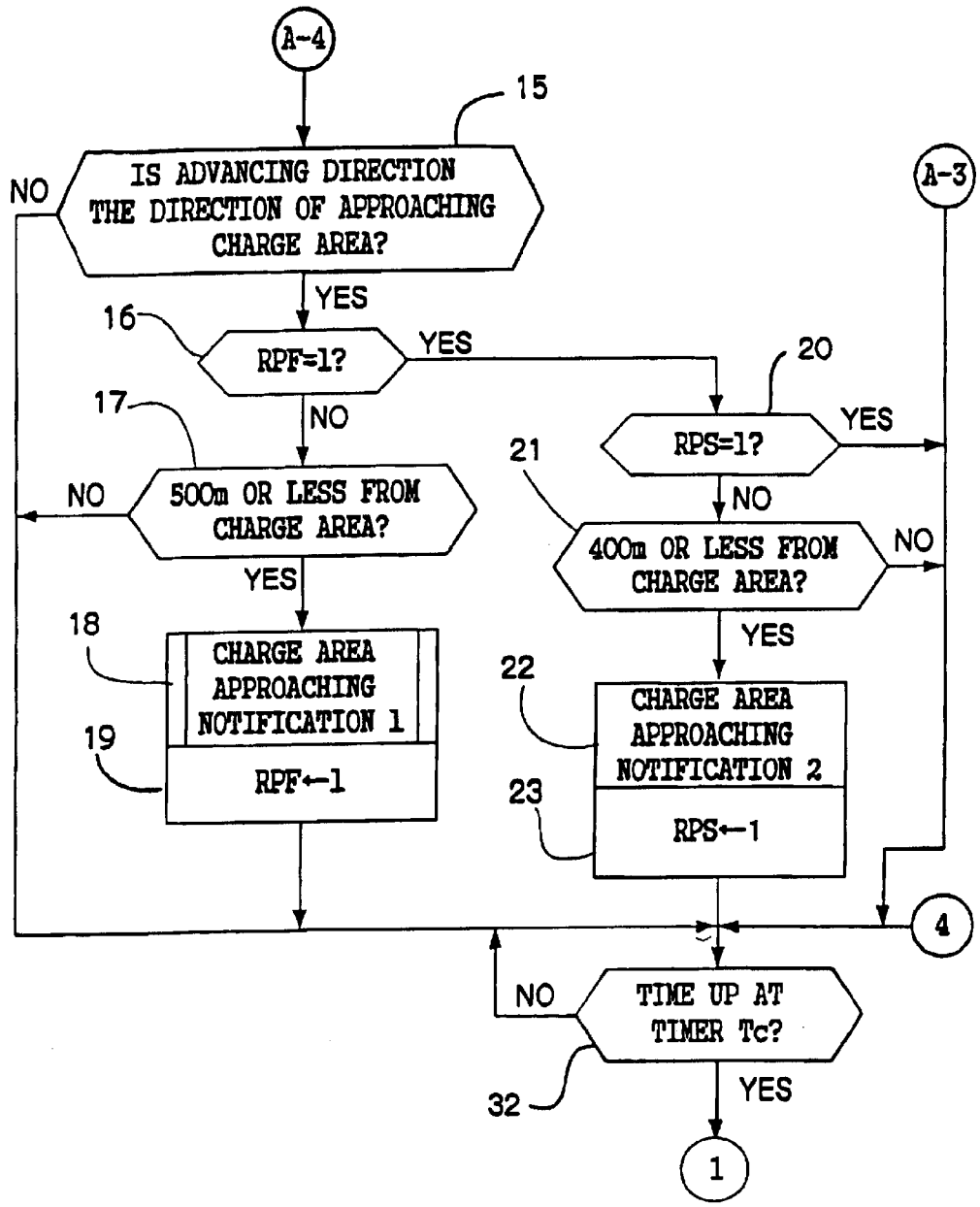

FIG. 5 and FIG. 6 show the summary of the charging control operations of the (CPU of the) charging control ECU 902. First, FIG. 5 will be referred to. The charging control ECU 902 waits for the ignition switch IGsw 963 to close (Si:H), and when the ignition switch IGsw 963 is closed, the data of the card CRD 953 is read into the internal memory via the card reader 905 (1 through 4). If no card CRD 953 is loaded, loading of a card is waited for, and when a card is loaded, the data of the card CRD 953 is read into the internal memory.

Next, the card balance of the read-in card data is displayed on the display device 904 (5). In order for data to not be repeatedly read-in after data reading-in has been carried out one time, a flag RIG is set (3), and after setting, the processings of 4, 5 are skipped. Next, the charging control ECU 902 starts a timer Tc of a Tc time limit (6). Then, data transfer is requested of the GPS information processing ECU 920. In response thereto, the GPS information processing ECU 920 transmits, to the charging control ECU 902, the transmission register data which was set in P19 in FIG. 4. The charging control ECU 902 receives these data, and writes them into the internal memory (7a).

Next, the charging control ECU 902 checks whether the data of the register RAF among the received data is "1" which means that GPS positioning is not possible and that the cause thereof is in the vehicle (7b). At a time when this switches to the aforementioned "1" from a "0" which expresses that GPS positioning is possible or, if impossible, that the cause is with the ground equipment, counting (accumulating computation) of the traveled distance after the radio waves were blocked is started (7d). Thereafter, it is observed whether the traveled distance (cumulative value) after the radio waves were blocked has reached a set value (7e). If the traveled distance after the radio waves were blocked is greater than or equal to the set value, a "1" expressing a GPS receipt impropriety is written in a register RUF (7f). When the data of the register RAF is "0", the traveled distance after the radio waves were blocked is cleared, and the register RUF is cleared (7c).

Next, the charging control ECU 902 checks whether the date and time received from the GPS information processing ECU 920 are within the table effective period in the charge table read in the internal memory, or if the current position received from the GPS information processing ECU 920 is within the table effective region which is shown by the table effective region information in the charge table read in the internal memory (8). When the date and time fall outside of the table effective period or the current position falls outside of the table effective region, in this case, the charge table is not appropriate for the current date and time or the current geographical region. Thus, a charge table request is emitted at the antenna ANTt (943) (9). At this time, the charge table request is emitted with the card ID, the balance (credit information), and the vehicle ID in the card data, as well as the current position (ground position) and moving direction obtained from the GPS information processing ECU 920, attached thereto. When the reporting station 930 receives this charge table request, the reporting station 930 saves the card ID, the balance and the vehicle ID, and the current position and moving direction in an internal memory at the card ID address, and emits the charge tables (Tables 2 through 4) which are in the charge database FDB 937 (41 through 44 of FIG. 11).

When the charging control ECU 902 receives the charge tables, the charging control ECU 902 checks whether the date and time received from the GPS information processing ECU 920 fall within the table effective period in the charge table, or whether the current position received from the GPS information processing ECU 920 falls within the table effective region which is shown by the table effective region information (10, 11). If the date and time fall within the table effective period and the current position falls within the table effective region, the charging control ECU 902 overwrites (update-writes) the received charge tables in the internal memory and the IC card CRD 953 (12). Then, receipt interruption 952 is permitted (13). When a radio wave signal reaches the antenna ANTt (943) and an unillustrated receiver of the telephone unit 908 generates an incoming signal which expresses that there is transmission (there is signal receipt), "receipt interruption" 952 is implemented in response thereto. The contents thereof will be described hereinafter with reference to FIG. 10. When receipt interruption 952 is permitted, the charging control ECU 902 gives the charge region information within the charge table to the GPS information processing ECU 920 (14). When the GPS information processing ECU 920 receives this charge region information, the GPS information processing ECU 920 applies the charge area (990) display (grid) to the corresponding region of the map display on the display device 924, which corresponds to the charge area which that information expresses.

Next, with reference to FIG. 6, thereafter, the charging control ECU 902 checks, at the period Tc, whether the current position falls in or falls out of the charge area represented by the charge region information of the charge table (A13 through 32-1 through 11-A13). Then, when the current position falls outside of the charge area and the advancing direction is a direction of approaching a charge area and the position is 500 m or less from the charge area, "Charge Area 500 m Ahead" and information of the charge table (however, the charge region information and the table effective region information are deleted therefrom) are displayed on the display device 904, and at the voice synthesizing unit 910 and the speaker SP 958, "A charge area is 500 m ahead." is reported by voice synthesis (A13 through 19).

Then, when the current position comes to 400 m or less from the charge area, the "Charge Area 500 m Ahead" in the display on the display device 904 is changed to "Charge Area 400 m Ahead", and "A charge area is 400 m ahead." is reported (13A through 16–20 through 23).

Note that the charge area is displayed in a superposed manner on the display map of the display device 924 in step 14 which is repeated at the period Tc. Further, the current position of the vehicle is also displayed by a direction-attached indicator on the display map. Thus, the driver can recognize, from the display of the display device 924, the position and the advancing direction of the vehicle with respect to the charge area.

When the vehicle enters the charge area, the charging control ECU 902 checks whether the data of the register RUF is "1" (GPS positioning not possible, wherein the cause lies with the vehicle: set in 7f in FIG. 5). If the data is "1", GPS abnormality is stored in the memory together with the date and time, and a GPS receipt impropriety is notified by the display device 904 and the vehicle-mounted speaker SP 958 (A13, 24a, 24b). A "1" expressing that the vehicle has entered into the charge area is written into the register (the internal memory). Then, information (the data of registers RPF, RPS), which expresses whether the vehicle has come to 500 m or less and to 400 m or less at the outside of the charge area, is cleared (24c, 25). The fact that the vehicle has entered into the charge area, i.e., "vehicle entry", is reported to the reporting station 930 (26). At this time, an entry report is emitted to the reporting station 930 with the card ID, the balance, and the vehicle ID within the card data, as well as the respective data expressing the date and time, the current position and the moving position obtained from the GPS information processing ECU 920, attached thereto. When the reporting station 930 receives this vehicle entry report, the reporting station 930 saves the date and time, the card ID, the balance, the vehicle ID, the position, and the direction in the internal memory, and prepares a management station side moving history table which is addressed with the card ID, and writes this into the vehicle entry/exit database TDB 938.

The charging control ECU 902 next executes "vehicle entry processing" (27). The contents thereof are shown in FIG. 7. Here, first, a one-minute timer, which determines the moving history data sampling period, is started (271). Next, an integer distance register, a fraction distance register, an integer distance register, a fraction distance register, and a moving side history table, which are allotted to the internal memory, are cleared (272). Then, the date and time, the balance, the position, the moved distance (the data of the integer distance register and the fraction distance register), the staying time (the data of the integer time register and the fraction time register), the state of the card reader 905 (ready: normal, not ready: abnormal), the presence/absence of loading of a card CRD 953 in the card reader 905, and the GPS state (including the above-described GPS abnormality) are written into the moving side history table (275). Note that, as will be described hereinafter, this writing is thereafter executed at one-minute periods while the vehicle is in the charge area. Table 5 shows examples of the contents of the moving side history table.

TABLE 5

Moving History Table

| Date and Time | Balance | Position | Moved Distance | Staying Time | Card Reader | Card | GPS |
|---|---|---|---|---|---|---|---|
| (a) | | | | | | | |
| 1998/01/01 10:10 | 09750 | N350000, E1370000 | XX | XX | normal | yes | normal |
| 1998/01/01 10:11 | 09750 | N350000, E1370001 | XX | XX | normal | yes | normal |
| 1998/01/01 10:12 | 09750 | N350000, E1370002 | XX | XX | normal | yes | normal |
| (b) | | | | | | | |
| 1998/01/01 10:10 | 09750 | N350000, E1370000 | XX | XX | normal | none | normal |
| 1998/01/01 10:11 | 09750 | N350000, E1370001 | XX | XX | normal | none | normal |
| 1998/01/01 10:12 | 09750 | N350000, E1370002 | XX | XX | normal | none | normal |
| (c) | | | | | | | |
| 1998/01/01 10:10 | 09750 | N350000, E1370000 | XX | XX | normal | yes | abnormal |
| 1998/01/01 10:11 | 09750 | N350000, E1370001 | XX | XX | normal | yes | abnormal |
| 1998/01/01 10:12 | 09750 | N350000, E1370002 | XX | XX | normal | yes | abnormal |

TABLE 5-continued

Moving History Table

| Date and Time | Balance | Position | Moved Distance | Staying Time | Card Reader | Card | GPS |
|---|---|---|---|---|---|---|---|
| (d) | | | | | | | |
| 1998/01/01 10:10 | 09750 | N350000, E1370000 | XX | XX | normal | none | abnormal |
| 1998/01/01 10:11 | 09750 | N350000, E1370001 | XX | XX | normal | none | abnormal |
| 1998/01/01 10:12 | 09750 | N350000, E1370002 | XX | XX | normal | none | abnormal |

Referring again to FIG. 6, after the vehicle has entered into the charge area and "vehicle entry" has been transmitted to the reporting station 930, while the vehicle is within the charge area, the charging control ECU 902 repeatedly executes "intermediate processing" (28) at the period Tc. The contents of this "intermediate processing" (28) are shown in FIG. 8.

When the charging control ECU 902 proceeds into the "intermediate processing" (28) shown in FIG. 8, the charging control ECU 902 first updates the data (fraction value) of the fraction time register to a value which is greater by the elapsed time Tc (281), and checks whether the updated fraction value has become one minute or more (282). If the updated fraction value is one minute or more, the charging control ECU 902 increments by 1 the data in the integer time register, and updates the data in the fraction time register t a value which is one minute smaller (283). Next, the charging control ECU 902 computes (284) the advanced distance during time Tc $$Dc=Tc(\text{sec})\times \text{speed (km/h)}/3600 \text{ (km)}.$$

Then, the charging control ECU 902 updates the data (fraction value) of the fraction distance register to a value which is greater by the moved distance Dc during Tc (285), and checks whether the updated fraction value is 1 km or more (286). If the updated fraction value is 1 km or more, the charging control ECU 902 increments by 1 the data in the integer distance register, and updates the data in the fraction distance register to a value which is 1 km smaller (287).

Next, it is checked whether time is up at the one-minute timer (288), and when time is up, the one-minute timer is started again (289). The date and time, the balance, the position, the moved distance (data of the integer and fraction distance registers), the staying time (data of the integer and fraction time registers), the reader state (ready: normal, not ready: abnormal), the presence/absence of a card (whether loaded or not), and the GPS state (the success or failure of position data generation), at that point in time, are written (290). Due to the repeated execution of this intermediate processing 28 and the writing of data into the moving side history table at one-minute periods, as shown in Table 5, each one minute, the data of the state at that time is stored in the moving side history table.

Figure 9:
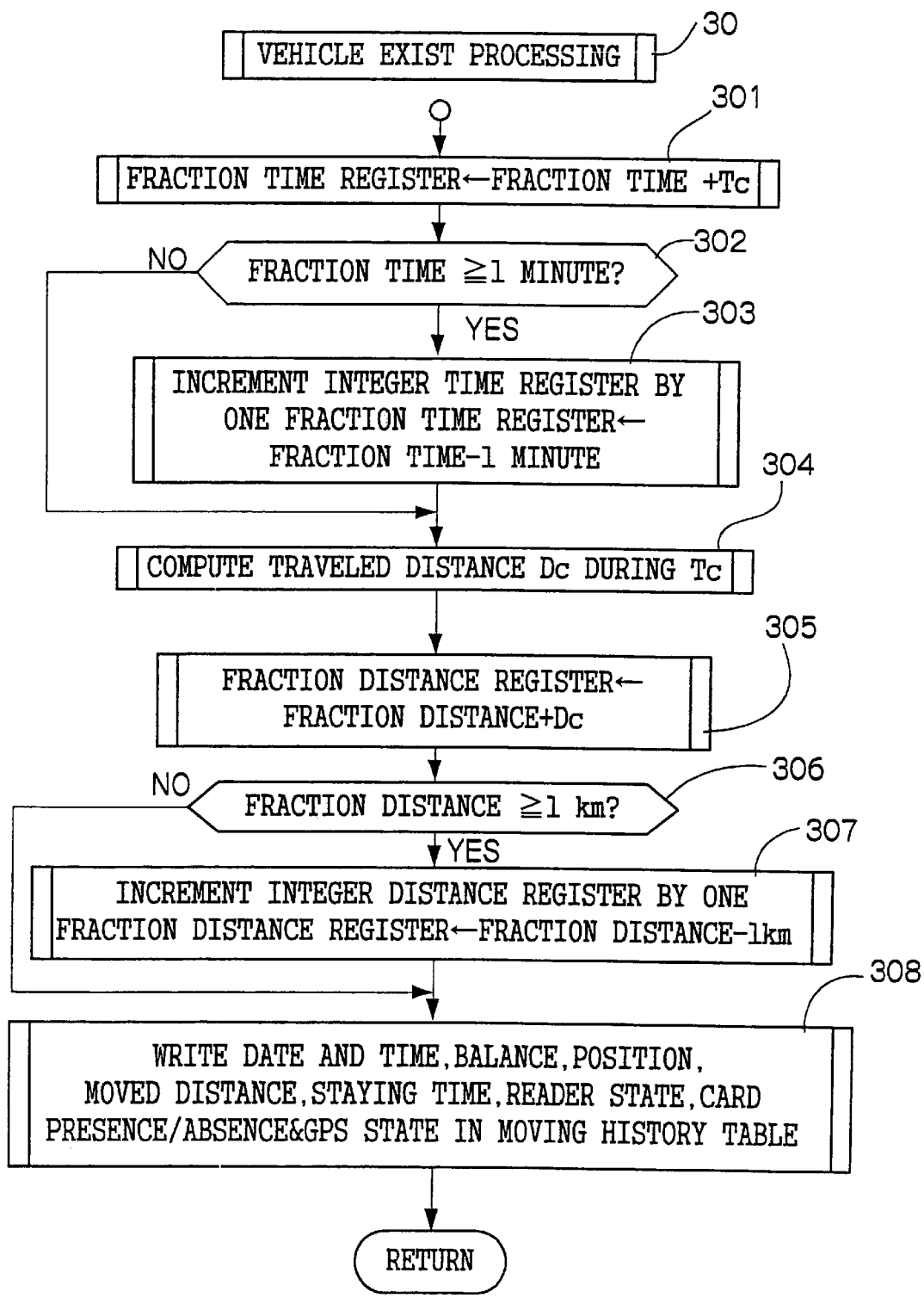
FIG. 9 is a flowchart showing the contents of "vehicle exit processing" 30 shown in FIG. 6.

FIG. 6 shall be referred to again. When the (current position of the) vehicle exits the charge area, the charging control ECU 902 proceeds from steps A13, A14 to step 29, and in step 29, changes the data of the register RAE to "0" which represents that the vehicle is outside of the charge area, and carries out "vehicle exit processing" (30). The contents of the "vehicle exit processing" (30) are shown in FIG. 9. In the same way as the previously-described "intermediate processing" (28), this "vehicle exit processing" (30) carries out accumulation (301 through 304) of the clock value of the amount of elapsed time during Tc, and carries out accumulation (305 through 307) of the moved distance of the amount of the traveled distance during Tc. Then, the "vehicle exit processing" (30) writes the final history data within the region into the moving side history table (308).

FIG. 6 shall be referred to again. When the above-described "vehicle exit processing" (30) is completed, the charging control ECU 902 transmits, to the reporting station 930, "vehicle exited" which means that the vehicle has exited the charge area (31). At this time, the card ID, the balance, and the vehicle ID in the card data, and the data of the moving side history table as well are transmitted to the reporting station 930. The reporting station 930 writes the received history data into the management side history table, which was allotted to that card ID at the time of "vehicle entry", of the vehicle entry/exit database TDB 938, and carries out checking of the charging processing state. The contents thereof will be described hereinafter.

After the vehicle exit reporting (31), the advancing direction of the vehicle is a direction of moving away from the charge area which has just been passed through. Thus, the charging control ECU 902 moves from step 15 to step 32, and does not execute relative distance reporting (16 through 23) with respect to the charge area.

In a case in which the vehicle has passed through one charge area (a first charge area) as described above and heads toward another charge area (a second charge area), when the (current position of the) vehicle leaves the table effective region, which is expressed by the table effective region information of the first charge table which expresses the first charge area, the charging control ECU 902 proceeds from step 8 to 9, and emits a charge table request. When this emitted radio wave is received at the first reporting station (930) which is addressed to the first charge area, and the first reporting station (930) emits the first charge table, and the charging control ECU 902 receives the first charge table, in step 10, it is judged that the received charge table is invalid. In this way, even if the charging control ECU 902 receives the first charge table after the (current position of the) vehicle has left the table effective region which is expressed by the table effective region information of the first charge table which expresses the first charge area, the first charge table is not written into the internal memory or the IC card CRD 953.

When the (current position of the) vehicle enters into the table effective region of the second charge area, the charging control ECU 902 writes the second charge table, which is emitted by a second reporting station which is not shown, into the internal memory and the IC card CRD 953, and carries out charging control in accordance with this data in the same way as described above.

As described above, when the vehicle reaches 500 m before the charge area, this is reported to the driver by the display device 904 and the speaker SP 958, and the information of the charge area is displayed on the display device 904. Further, when the vehicle reaches 400 m before, notification is carried out again. Thus, the driver can decide, with leeway, whether or not to enter the charge area, and can select, with leeway, a detour path.

The checking of step 1 as to whether the ignition key switch IGsw 963 is closed (Si=H) is a judgement as to whether the vehicle is currently parked or not. In a case in which the vehicle enters into a charge area where a time fee charge table (Table 2) is applicable, when the ignition key switch IGsw 963 is open (Si=L: an interruption instruction to interrupt the clocking for charging), the charging control ECU 902 waits for the ignition key switch IGsw 963 to be closed (Si=H: an instruction to clock for charging), and while waiting, does not execute the "intermediate processing" of step 28. Accordingly, the time over which the vehicle is parked within the charge area is not included into the time of staying in the charge area for computation of the charge amount of the time fee.

When the reporting station 930 receives a charge table request from the charging device 1, the reporting station 930 emits the "charge table" to that ID. Further, at a fixed period of about several minutes, the reporting station 930 emits a "charge request" to all of the vehicles, and at a fixed period of about several minutes or at an irregular period, sends a "moving history request" successively to each ID, and collects data of the moving side history table from each ID. Further, when a "vehicle exited" report is received, the reporting station 930 emits, to the charging device ID (card ID) which has given that report, a charge request to that ID when there is an uncharged moved distance or staying time. Moreover, when a "vehicle exited" report is received, the reporting station 930 checks the corrections of the charging processing. If the reporting station 930 discovers a charging error, the reporting station 930 emits, to that ID, message data which points this out and which urges measures.

Figure 10A:
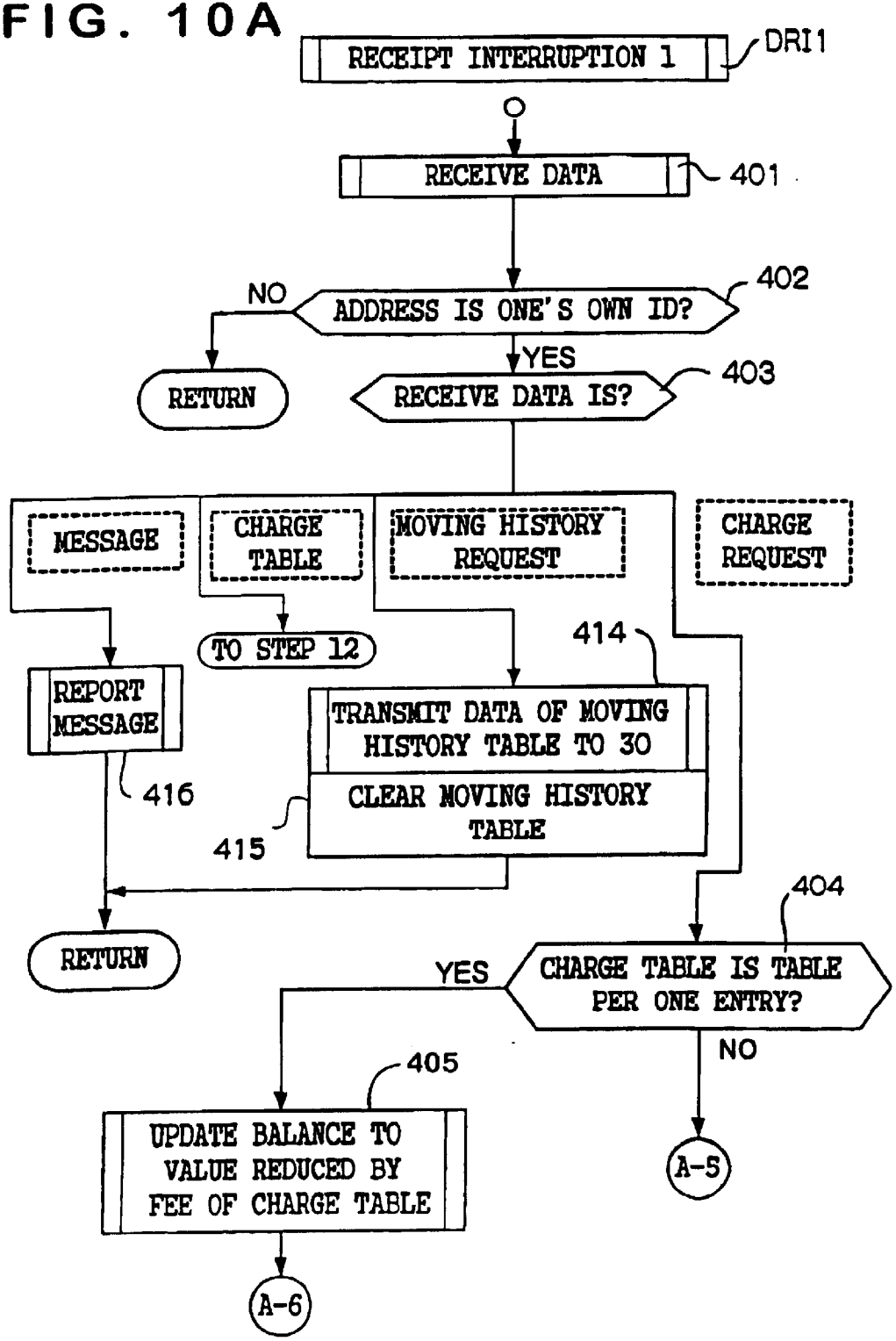
FIG. 10 is a flowchart showing the contents of interruption processing 1 DRI1 in response to radio wave signal receipt, of the charging control ECU 902 shown in FIG. 2.
Figure 10B:
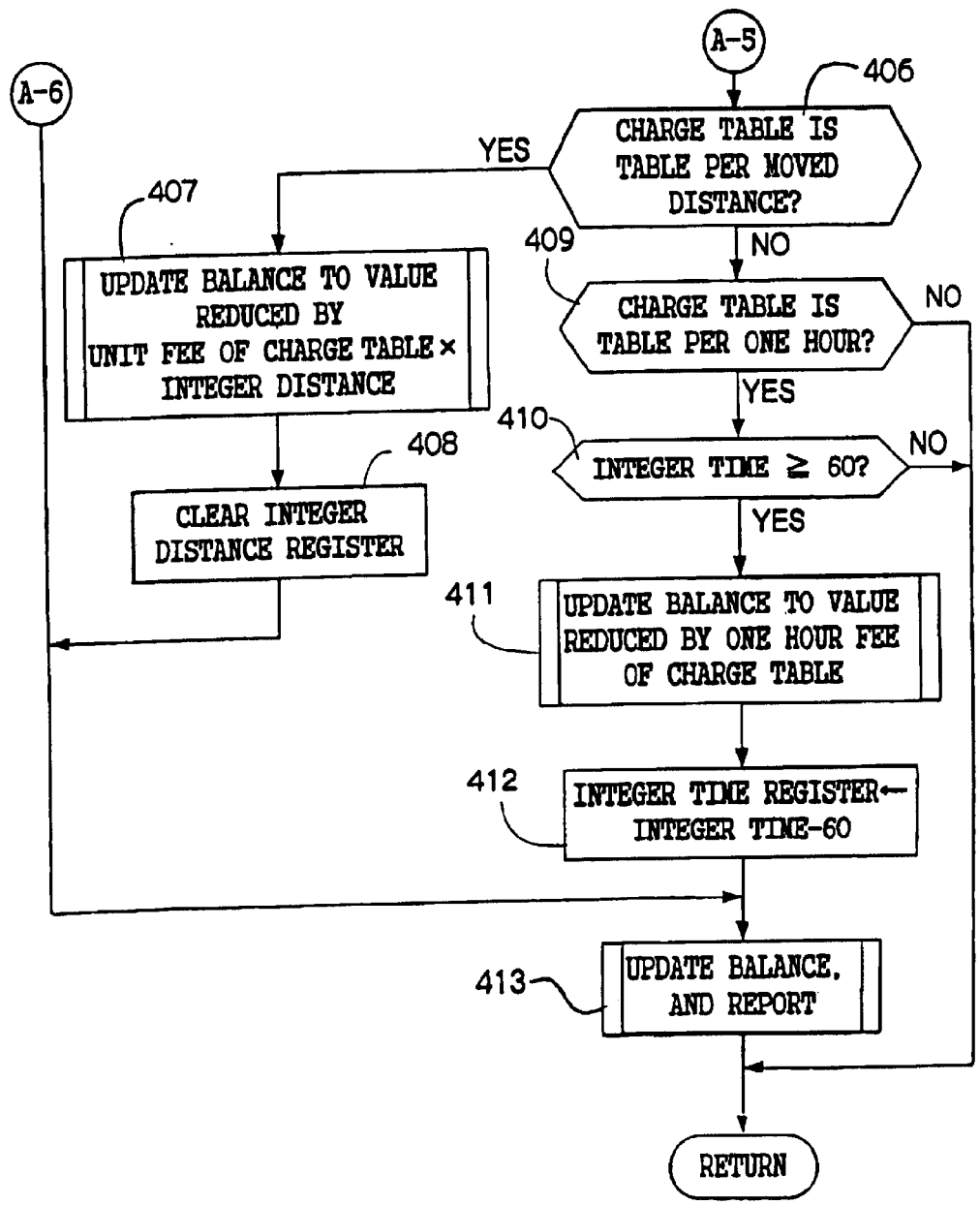

FIG. 10 shows the contents of "receipt interruption 1" DRI1 which the charging control ECU 902 executes in response to when a radio wave signal reaches the antenna ANTt (943) and an unillustrated receiver of the telephone unit 908 generates an incoming signal which expresses that there is transmission (there is signal receipt 401). When the charging control ECU 902 proceeds into the receipt interruption 1 DRI1, the charging control ECU 902 checks whether the address is its own card ID (also including a case in which all vehicles are designated) (402). If the address is its own card ID, the charging control ECU 902 judges whether the received data is a charge request, or a moving history request, or a charge table, or a message (403).

If the received data is a "charge request", when the charge table of the card CRD 953 is a table per entry (Table 4), the charging control ECU 902 extracts the fee corresponding to the vehicle type classification within the card data, and updates the card balance in the card data of the internal memory to a value which is reduced by that fee (404, 405). The charging control ECU 902 similarly updates the data of the IC card CRD 953, and updatingly displays the balance on the display, and checks whether the card balance is a negative value (insufficient fee payment). If the card balance is a negative value, "Insufficient Payment, Settling of Account Required" is displayed on the display device 904, and "Your card balance is insufficient. Please settle your account." is reported by voice synthesis at the voice synthesizing unit 910 and the speaker SP 958 (413).

When the charge table is a table per moved distance (Table 3), the fee, of the charge table, per km corresponding to the vehicle type classification within the card data is extracted and multiplied by the value of the integer distance register, and the card balance in the card data of the internal memory is updated to a value which is reduced by the amount of the obtained product (406, 407). The integer distance register is cleared (408), and similarly, the data of the IC card CRD 953 is also updated, and updated display of the balance is carried out (413).

When the charge table is a table per staying time (Table 2), it is checked whether the value of the data in the integer time register is 60 (one hour) or more (410). If the value is 60 or more, the fee, of the charge table, per unit time corresponding to the vehicle type classification in the card data is extracted, and the card balance in the card data of the internal memory is updated to a value reduced by that much (409 through 411). The contents of the integer time register are updated to a value which is reduced by 60 (412), and similarly, the data of the IC card CRD 953 is also updated, and updated display of the balance is carried out (413).

When the received data is a "request for moving history", the charging control ECU 902 transmits the data of the moving side history table to the reporting station 930 (414), and clears the moving side history table (415). When the received data is "charge table", the charging control ECU 902 moves onto the card data updating of step 12 (FIG. 5) which was explained previously. When the received data is a message, the message is displayed on the display and reported by voice synthesis (416).

When the charge table is a charge per entry, when the reporting station 930 emits a charge request, the reporting station 930 writes that charging is completed in the management station side moving history table, which is generated for each card ID in the vehicle entry/exit database TDB 938 at the time that "vehicle entry" is reported. Thereafter, the reporting station 930 does not emit charge requests to the IDs for which charging has been completed, and emits charge requests only to the IDs for which it has not been written that charging is completed. When the charge table is a table which charges for the moved distance, the reporting station 930 repeatedly emits charge requests to all the IDs at a fixed period of about several minutes or at an irregular period. When the value of the integer distance register of the charging device which has received the charge request is 1 (km) or more, the charging device carries out a charging processing of that value×fee per km, and clears the integer distance register. Thus, each time the reporting station 930 generates a charge request, the charging device carries out charging processing only for the integer value (km unit) in the moved distance from receipt of the previous charge request to receipt of this charge request. The fraction distance is carried over. Similarly, when the charge table is a table which charges for the staying time, the reporting station 930 repeatedly emits charge requests to all the IDs at a fixed period of about several minutes or at an irregular period. When the value of the integer time register of the charging device which has received the charge request is 60 (1 hour) or more, the charging device carries out a charging processing of the fee for one hour, and updates the data of the integer time register to a value which is 60 minutes smaller. Thus, each time the reporting station 930 generates a charge request, the charging device carries out charging processing only for the integer time in the elapsed time from receipt of the previous charge request to receipt of this charge request. The fraction time is carried over.

At the time of "vehicle exited", because the timing thereof and the charge request timing do not match, even if the charge table is a table which charges in distance units or time units, it is possible for there to be "vehicle exited" when there is an integer distance or an integer time to be charged. When the reporting station 930 receives a "vehicle exited" report, the reporting station 930 checks the integer distance data or the integer time data, and if it is 1 (km) or more or is 60 (1 hour) or more, transmits a charge request to the ID which reported "vehicle exited".

Figure 11B:
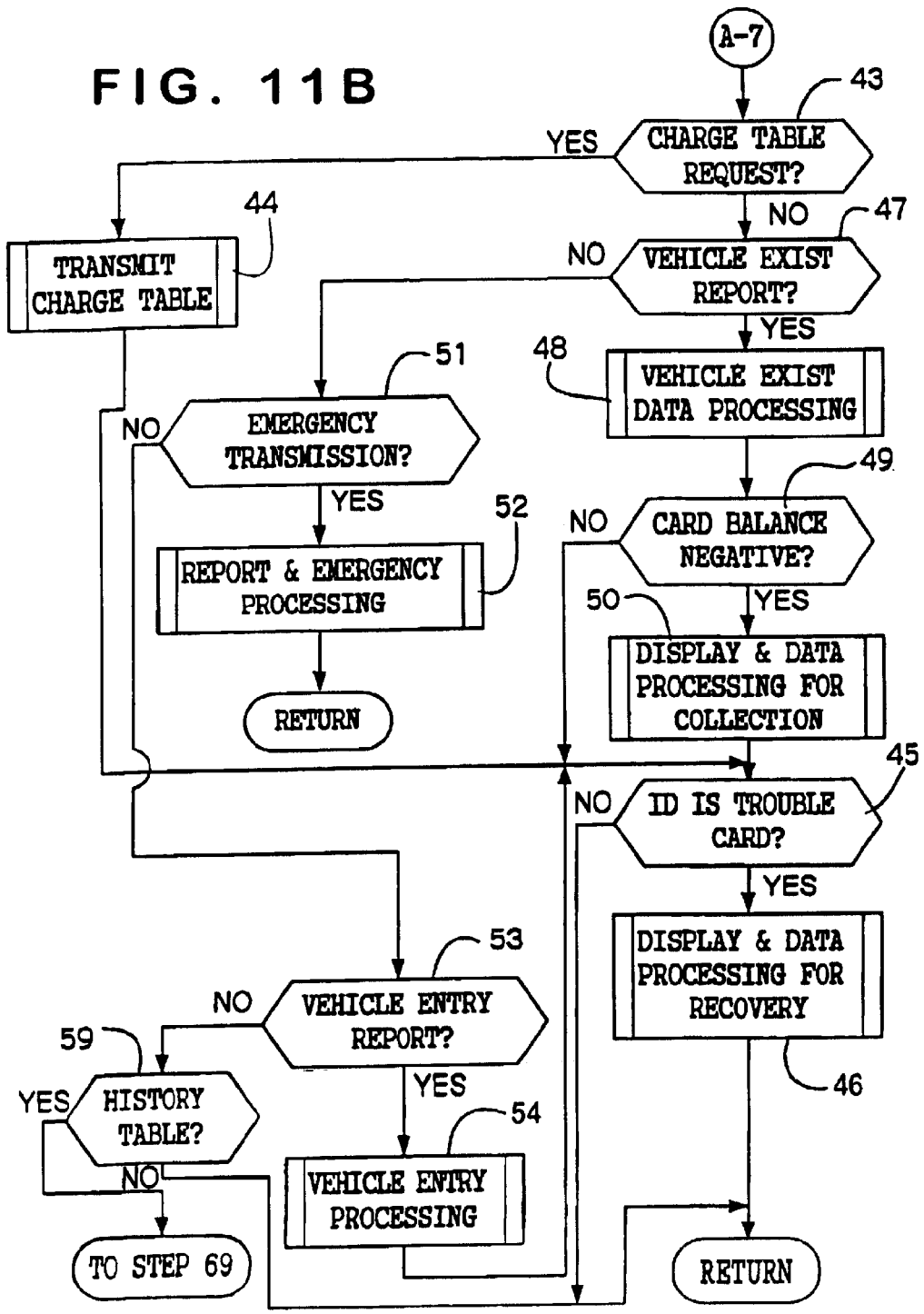
FIG. 11 is a flowchart showing the contents of interruption processing 2 DRI2 in response to an incoming signal from a communication device 931 or a modem unit 934, of a controller unit 932 shown in FIG. 3.

FIG. 11 shows the contents of interruption processing of the controller unit 932 of the reporting station 930. This interruption processing DRI2 is executed in response to detection of the communication device 931 of the arrival (incoming) of a radio wave signal to the antenna 940, or to incoming into the modem unit 934. When incoming is received, when it is incoming from the charging control ECU 902 of the charging device 901 of the vehicle, the unit 932 receives the incoming (42), and when the incoming is a charge table request, the unit 932 saves the data, which is appended thereto and which expresses the date and time, the card ID, the balance, the vehicle ID, the position and the direction, in the internal memory. In response to the request, the unit 932 emits the charge table of the database FDB 937 at the antenna 940 (41 through 44). Then, the unit 932 detects, via the managing unit 933, if the received card ID or vehicle ID is a trouble (usage error in the past, loss, theft, abolishment when reissued, illegal copying) card ID or a stolen or an accident vehicle ID which is stored in the monitoring database WDB 936 (45). Then, if the ID is such an ID, the unit 932 displays on the display of the terminal PC 939 and prints-out, as a monitor data set, the card ID, vehicle ID=vehicle No., the contents of the trouble, and the current position (received data) and current time, and transmits this to the management center 950 and the card issue & account settling spots 971 through 973. These institutions can register the data corresponding to the contents of the trouble and take action.

When the charging control ECU 902 of the charging device 901 emits vehicle exit notification data which expresses that the vehicle has left the charge area, and the controller 932 of the reporting station 930 receives this, the controller 932 saves the date and time, the card ID, the vehicle ID, the current position, the moved distance (the amount which has not yet been subjected to charging processing), the staying time (the amount which has not yet been subjected to charging processing), the direction, and the card balance, in the internal memory 47. When the charge table is a table which charges for the moved distance, the controller 932 checks whether the moved distance is 1 km or more, and if so, emits a charge request to that card ID. When the charge table is a table which charges for the staying time, the controller 932 checks whether the staying time is 60 minutes or more, and if so, emits a charge request to that card ID. Then, the controller 932 checks whether there is usage error information of the charging device in the management side history table of that ID address of the vehicle entrance/exit database TDB 938,or whether the card balance is negative (−). If there is no usage error and the card balance is positive, the controller 932 erases the management side history table of that ID. Note that, in the "fee collection &moving history accumulation" CRC (FIG. 12) which will be described later, on the basis of the history data of the management side history table, when the usage error information is information expressing that there is a usage error, the usage error information is written into the management side history table. Next, on the basis of the position data, the leaving road (area entrance and exit date) is specified, and the amount of vehicles exiting at that leaving road of the vehicle entrance/exit database TDB 938 is incremented by 1 (48).

Then, if the card balance is negative (−), this data (the card ID, the vehicle ID, the current position, the direction, and the card balance) is given to the terminal PC 939, and is displayed on the display, and printed out. It is checked, via the managing unit 933, whether that card ID or that vehicle ID is in the nonpayment database CDB 935, and if so, the card balance of the applicable one in the nonpayment database CDB 935 is updated to this time's value. If there is not an applicable one, the data obtained this time (card ID, vehicle ID, current position, direction, and card balance) is newly recorded in the nonpayment database CDB 935 (49, 50). Then, the ID checking and the like (45, 46) which have already been described are carried out.

There is an emergency message switch at the operation, display board 903 connected to the charging control ECU 902 of the charging device 901. When the operator operates the emergency message switch, the charging control ECU emits, at predetermined periods and at the antenna ANTt (943), emergency data including the vehicle ID, the current position and direction. When the reporting station 930 receives the data, the reporting station 930 displays, at the terminal PC 939, and prints out an emergency occurrence and the vehicle ID, current position and direction, and transmits the emergency data to the management center 950 (51, 52).

The charging control ECU 902 of the charging device 901 emits "vehicle entry" notification data which expresses that the vehicle has entered the charge area. When the controller 932 of the reporting station 930 receives this (53), the controller 932 generates, in the vehicle entrance/exit database TDB 938, a management side moving history table to which the card ID of that charging device 901 is allotted. The controller 932 therein the received date and time, balance, position, moved distance, staying time, reader state, presence or absence of card, and GPS state, and specifies the entry road (area entrance and exit date) on the basis of the position data, and increments by 1 the amount of vehicles entering at that entry road of the vehicle entrance/exit database TDB 938 (54). Then, the ID checking and the like (45, 46) which have already been described are carried out.

When settled account data (card ID, vehicle ID and card balance) from the card issuing & account settling spots 971 through 973 is sent in, if the received card balance is positive (plus), the controller 932 deletes the data of that ID of the nonpayment database CDB 935 (deletes the nonpayment registration) If the card balance is negative (minus), the controller 932 updates the card balance of that ID to the received card balance (41, 55 through 57).

The data of the databases CDB 935, FDB 937, WDB 936 and TDB 938 can be managed (read-out, transferred, outputted, written, erased) at the terminal PC 939 and the management center 950. When the terminal PC 939 or the management center 950 accesses the controller 932, the controller 932 carries out data processing (reading-out, transferring, outputting, writing, erasing) in accordance with the instruction thereof (58). The management center 950 carries out traffic management and fee collection management inside of the charge area and outside of the charge area, and carries out monitoring and tracking of trouble cards and vehicles. For traffic management, the management center 950 refers, periodically and appropriately, to the data of the vehicle entrance/exit database TDB 938, and grasps the trends of the amount of traffic by computing, in predetermined time period segments, the amount of vehicles staying the charge area (the sum of the amount of entered vehicles for each area entrance and exit date−the amount of exited vehicles) and the differential value thereof (the trend toward a traffic jam, trend toward easing of a traffic jam). From a short term viewpoint, the management center 950 carries out traffic information reporting, and from a long term viewpoint, the management center 950 carries out correction, abolition, and the like of the charge tables. In the charge collection management, the management center 950 carries out the work of collecting unpaid fees from (the owners of) vehicles for which the absolute value of the negative value of the card balance of the nonpayment database CDB 935 is large. The data of the monitoring database WDB 936 is utilized in discovering trouble cards and vehicles.

Figure 12:
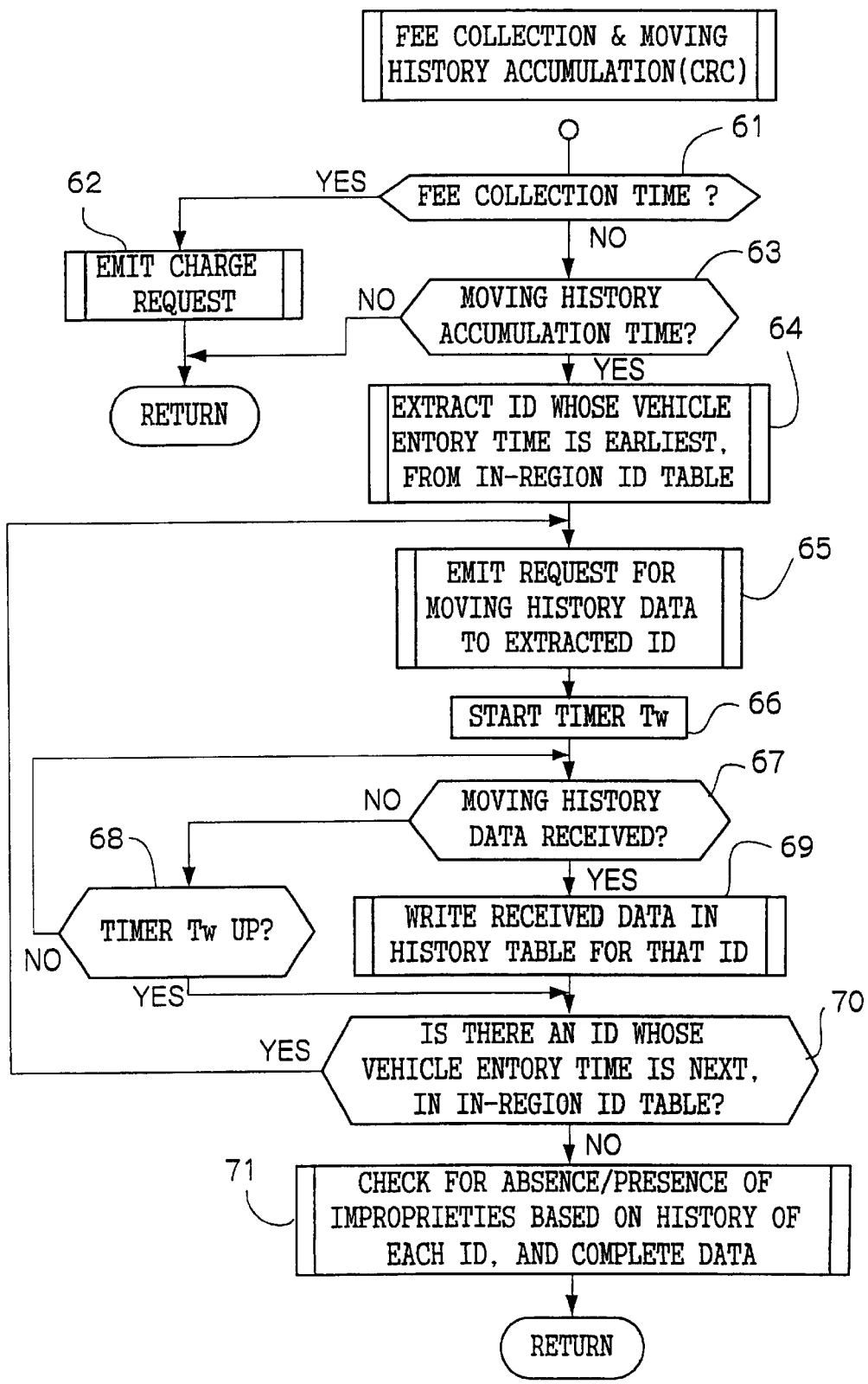
FIG. 12 is a flowchart showing the contents of "fee collection & movement history accumulation" which is repeatedly executed, of the controller unit 932 shown in FIG. 3.

In a case in which the receipt interruption 2 (DRI 2) is not activated, the controller unit 932 of the reporting station 930 executes the "fee collection & moving history accumulation" CRC shown in FIG. 12 at a fixed period. When proceeding into this processing, the unit 932 emits (61, 62) a charge request at the communication device 931 and the antenna 940 when a fee collection time, which is set at a fixed period (of about several minutes) or at a pitch of about several minutes but an irregular period in order to make charge avoiding processing of ill-intended users difficult, is reached. Further, similarly, when a moving history accumulation time which is set at a fixed period or an irregular period is reached, the unit 932 successively emits a moving history data request to each ID generating a management side moving history table in the vehicle entrance/exit database TDB 938, and successively receives the moving history data of each ID, and writes it in the management side moving history table of each ID (63 through 70). Namely, at the vehicle entrance/exit database TDB 938, a management side moving history table of each ID is generated in the order of the date and time of "vehicle entry". A moving history data request is emitted to the ID of the earliest date and time thereof (64, 65), and a timer Tw is started (66), and until time is up, a response (moving side history table) from that ID is waited for (67, 68). When there is a response, it is written in the management side moving history table for that ID (69). When this is completed, or when time is up at the timer Tw without a response, a moving history data request is emitted to the ID having the next earliest writing date and time (70, 65). In this way, when data requesting and receiving (i.e., polling) for all of the IDs for which a management side moving history table is generated at the vehicle entrance/exit database TDB 938 is completed, on the basis of the data of the management side moving history table of each ID of the vehicle entrance/exit database TDB 938, the presence or absence of a charging device usage error of each ID (card ID) is checked (71).

Namely, for example, immediately after an ID (charging device 901) has "vehicle entered" into a charge region, until a first time moving history accumulation is carried out, the data at the time that the vehicle "vehicle entered", i.e., the data (date and time, balance, position and direction) transmitted to the reporting station 930 at step 26 in FIG. 6, is in (the first column of) the management side moving history table of that ID. Then, in the moving history accumulation of the first time, for example, when the moving side history data shown in Table 5 is collected, it is written in (the columns from the second column on in) the management side moving history table.

The (a) of Table 5 shows an example of data of a moving side history table at the time of a normal state when charging processing is possible, (b) shows an example of data in an unloaded state in which there is no card and charging (fee withdrawal) processing is not possible, (c) shows an example of a time when there is the above-described GPS abnormality, and (d) shows an example of a time when there is no card and a GPS abnormality.

When there is a negative balance, a card reader non-normality, no card, or a GPS non-normality, the controller unit 932 writes usage error information in the management side moving history table. Further, by carrying out, in the order (column No.) in the management side moving history table, comparative computation, which corresponds to the type of charge table (Table 2 through Table 4), between the progress of the data of the same item and data of other items, variations or non-variations which do not appear in normal charging processing are checked. If there are such variations or non-variations, usage error information is written in the management side moving history table. If there are no usage errors, the portion of the data of the moving side history table read this time is left, and the data stored therebefore is erased from the management side moving history table. If there is usage error information, such data erasure is not carried out, and each time collection is carried out, data is accumulated and stored in the management side moving history table. Then, when that vehicle (card ID) "vehicle exits", the management side moving history table of that ID is transcribed into the monitoring database WDB 936, and is erased from the vehicle entry/exit database TDB 938.

The embodiment which was described above is a charging system which charges in area units in a road network. An entire highway network or a portion thereof, or a specific region of a regular road network or the like can be specified as the charge area, and charging can be carried out on vehicles passing therethrough. However, the present invention can be implemented not only as a road network charging system, and can be implemented as an entrance fee collection system for tourist spots, event areas, or the like.

What is claimed is:

1. A charging system comprising:
   a GPS positioning device for detecting a position of a moving body;
   a monitor device which, by using the GPS positioning device, generates information expressing a ground position of the moving body; and
   a charging processing device which, by using the information generated by the monitoring device, judges whether or not the ground position is within a charge region, and if the charging processing device judges that the ground position is within a charge region, the charging processing device carries out data processing for charging the moving body, wherein the monitor device has simple data including at least absolute positions and configurations of facilities or geographical features which make it impossible to receive a GPS positioning signal, and when it is impossible to receive the GPS positioning signal, by the information generated by the monitoring device which was generated before it became impossible to receive the GPS positioning signal, the monitor device detects, from the simple data, a facility or geographical feature which made it impossible to receive the GPS positioning signal at a current time, and changes the detected absolute position of the facility or the geographical feature to the information generated by the monitoring device and makes the information generated by the monitoring device be the current ground position of the moving body and the information includes data expressing positions of both ends of a radio wave blocked interval of a facility or a geographical feature.

2. A charging system according to claim 1, wherein the charging processing device has a storage device which stores:
   a plurality of identifying information for identifying a moving body, which identifying information relate to the moving body;
   a plurality of charging information which relate to the charge region; and
   a plurality of moving history information which relate to movement of the moving body.

3. A charging system according to claim 2, wherein the information for identifying a moving body includes reserve fund information relating to the moving body, and the reserve fund information holds a current amount which allows the moving body to pay a charge of the charging system.

4. A charging system according to claim 3, further comprising a reading and writing device for reading and writing reserve fund information in the storage device.

5. A charging system according to claim 4, wherein when the charging processing device judges, by the monitor device, that the moving body is passing through a charge region, the charging processing device updates the reserve fund information of the storage device by using the reading and writing device.

6. A charging system according to claim 1, further comprising a communications device for communicating with a reporting station which carries out management of the charging system.

7. A charging method comprising:

detecting a position of a moving body;

generating information expressing a ground position of the moving body, by using the position of the moving body which was detected;

judging, by using the information expressing a ground position, whether or not the ground position is within a charge region, and in a case in which it is judged that the ground position is within the charge region, carrying out data processing for charging the moving body in accordance with travel through the charge region, wherein, when it is impossible to receive a GPS positioning signal, by the information expressing a ground position generated before GPS positioning became impossible, a facility or geographical feature which is a cause of GPS positioning impossibility at a current time, is detected from simple data including at least absolute positions and configurations of facilities or geographical features which made it impossible to receive the GPS positioning signal, and the detected absolute position of the facility or the geographical feature is changed to the information expressing a ground position and the information expressing a ground position is made to be the current ground position of the moving body.

* * * * *